United States Patent
Emori et al.

(10) Patent No.: US 6,633,697 B2
(45) Date of Patent: Oct. 14, 2003

(54) RAMAN AMPLIFICATION METHOD AND OPTICAL SIGNAL TRANSMISSION METHOD USING SAME

(75) Inventors: Yoshihiro Emori, Chiyoda-ku (JP); Shu Namiki, Chiyoda-ku (JP)

(73) Assignee: Ther Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/774,026

(22) Filed: Jan. 31, 2001

(65) Prior Publication Data

US 2002/0021864 A1 Feb. 21, 2002

Related U.S. Application Data

(63) Continuation of application No. PCT/JP00/03439, filed on May 29, 2000.

(30) Foreign Application Priority Data

May 31, 1999 (JP) .......................................... 11-151723
Nov. 29, 1999 (JP) .......................................... 11-338639

(51) Int. Cl.$^7$ ................................................ G02B 6/26
(52) U.S. Cl. ................................ 385/27; 385/24; 372/6
(58) Field of Search ................................ 372/6; 385/24, 385/27

(56) References Cited

U.S. PATENT DOCUMENTS

| | | | |
|---|---|---|---|
| 4,401,364 A | 8/1983 | Mochizuki ................. 385/24 X |
| 4,616,898 A | 10/1986 | Hicks, Jr. .................. 385/42 X |
| 4,699,452 A | 10/1987 | Mollenauer et al. ....... 385/24 X |
| 4,881,790 A | 11/1989 | Mollenauer ............... 385/24 X |
| 5,131,069 A | * 7/1992 | Hall et al. |
| 5,218,608 A | * 6/1993 | Aoki |
| 5,542,011 A | * 7/1996 | Robinson |
| 5,623,508 A | * 4/1997 | Grubb et al. ............... 372/3 |
| 5,673,280 A | 9/1997 | Grubb et al. ............... 372/3 |
| 5,883,736 A | 3/1999 | Oshima et al. ............ 359/341 |
| 5,887,093 A | 3/1999 | Hansen et al. ............. 385/27 |
| 5,946,428 A | 8/1999 | Aleksandrov et al. ..... 385/11 |
| 5,959,750 A | 9/1999 | Eskildsen et al. ......... 359/134 |
| 5,966,206 A | 10/1999 | Jander ...................... 356/73.1 |
| 5,966,480 A | 10/1999 | LeGrange et al. .......... 385/24 |
| 6,038,356 A | 3/2000 | Kerfoot, III et al. ........ 385/24 |
| 6,052,219 A | 4/2000 | Kidorf et al. .............. 359/334 |
| 6,081,323 A | 6/2000 | Mahgerefteh et al. ..... 356/73.1 |
| 6,081,366 A | 6/2000 | Kidorf et al. .............. 359/341 |
| 6,115,174 A | 9/2000 | Grubb et al. .............. 359/134 |
| 6,147,794 A | 11/2000 | Stentz ....................... 359/334 |
| 6,163,636 A | 12/2000 | Stentz et al. ............... 385/24 |
| 6,178,038 B1 | 1/2001 | Taylor et al. .............. 359/341 |
| 6,191,877 B1 | 2/2001 | Chraplyvy et al. ......... 359/124 |
| 6,212,310 B1 | 4/2001 | Waarts et al. .............. 385/24 |

(List continued on next page.)

Primary Examiner—Brian Healy
(74) Attorney, Agent, or Firm—Oblon, Spivak, McClelland, Maier & Neustadt, P.C.

(57) ABSTRACT

First pump light for Raman-amplifying optical signal is inputted to the output end of the optical signal, and second pump light used for Raman-amplifying the first pump light and having a wavelength shorter than that of the first pump light is inputted to the input end of the optical signal. The second pump light is also inputted to the output end of the optical signal. The first pump light is also inputted to the input end of the optical signal. The Raman amplification band of the second pump light is made not to be overlapped with that of the optical signal. The wavelength of the second pump light is shorter than that of the first pump light by the Raman shift of the amplifier fiber. The light source of either the first or second pump light or both the light sources of them are multiplex optical sources. The first pump light is emitted from a semiconductor laser. Third pump light for Raman-amplifying the second pump light is directed to an optical transmission line. The optical signal is transmitted through a transmission line using the Raman amplification method.

53 Claims, 27 Drawing Sheets

U.S. PATENT DOCUMENTS

| | | | |
|---|---|---|---|
| 6,181,464 B1 | 6/2001 | Kidorf et al. | 359/334 |
| 6,263,139 B1 | 7/2001 | Kawakami et al. | 385/123 |
| 6,266,180 B1 | 7/2001 | Inagaki et al. | 359/337 |
| 6,282,002 B1 | 8/2001 | Grubb et al. | 359/160 |
| 6,320,695 B1 | 11/2001 | Tanaka et al. | 359/341.33 |
| 6,320,884 B1 | 11/2001 | Kerfoot, III et al. | 372/3 |
| 6,344,922 B1 | 2/2002 | Grubb et al. | 359/334 |
| 6,377,389 B1 | 4/2002 | Grubb et al. | 359/334 |

* cited by examiner

RAMAN AMPLIFICATION METHOD AND OPTICAL SIGNAL TRANSMISSION METHOD USING SAME

BACKGROUND OF THE INVENTION

1. Field of the Invention

The present invention relates to a Raman amplification method used in optical communication system and an optical transmission method using such a method.

2. Related Background Art

A frequency component (wavelength component) of an optical signal intensity of which is modulated and which has been used in existing optical communication system has a certain width. On the other hand, an optical fiber has a dispersion property that a propagating speed is changed depending upon a wavelength. Due to these two properties, when the optical signal is propagated through the optical fiber, a signal wave form is distorted because of difference in propagating speed between the wavelength components. When a pulse is inputted as the optical signal, since a pulse width is widened after propagation, this phenomenon is called as "pulse broadening due to dispersion" (for example, refer to Foundation Of Optical Waveguide written by Katsunari Okamoto and published From Corona Co.).

Although digital format is resistant to the change of wave form than analog format, error in detection is considerably increased if the overlap with adjacent bits become greater due to pulse broadening. To avoid this, in the prior arts, a wavelength having smaller (near zero) dispersion has been used to suppress the pulse broadening or spread pulse has been returned to the original form by delaying the wavelength component preceding through medium having dispersion opposite to that of the transmission line and by hastening the delayed wavelength component.

However, in the recent optical communication system, due to high output of the optical signal and multiplexing of the wavelength, a non-linear phenomenon within the optical fiber has become noticeable and distortion of the wave form could not be coped with only in the view point of dispersion. Main non-linear phenomena in question include self phase modulation (SPM), cross phase modulation (XPM) and four wave mixing (FWM). In SPM and XPM, phase of light is changed by a little change in refractive index of the optical fiber caused in accordance with light intensity. Since the change in phase causes instantaneous change in frequency and the changed amount is not constant, non-reversible wave form distortion is generated by the dispersion property of the optical fiber. The FWM is a phenomenon in which, when a polarization field is induced by plural inputted lights having different frequency, components different from the frequencies of the inputted lights are created, thereby generating light having new frequency. The FWM becomes noticeable particularly when the dispersion is near zero. If the light generated by the FWM coincides with the wavelength used as the signal, the error in detection will be increased.

As means for preventing deterioration of the transmission property based on such non-linearity of the optical fiber, there are two approaches. First approach is a method for reducing light intensity within the optical fiber to decrease the non-linear effect, and a second approach is a method for using a transmission method utilizing the non-linear effect. The former method can be realized by merely lowering an input level to the optical fiber or by utilizing an optical fiber having a large mode field diameter. The latter method can be realized by utilizing optical soliton. However, even when these methods are used, there remain the following problems.

If the input level to the optical fiber is lowered, since a signal/noise ratio (S/N ratio) at a receiving side is decreased, the error in detection will be increased. This can be interpreted so that a transmittable distance becomes shorter. Since the optical fiber having the large mode field diameter has a large dispersion slope (wavelength dependency of dispersion), it is difficult to set optimum dispersion with respect to all of channels in which the wavelengths are multiplexed. In the optical soliton communication system, due to perturbation (such as transmission loss or unevenness of dispersion) existing in the actual transmission line, dispersive wave out of the soliton condition are generated, which deteriorate the transmission property. As mentioned above, although the existing optical communication systems must be designed in careful consideration of several limitation factors, if there is no loss in the optical fiber as the optical transmission line, such limitations will be greatly relaxed. For example, in the transmission line having no loss, since there is no deterioration of the S/N ratio based on the propagation loss, the limitation factors caused by lowering the input level to the optical fiber are relaxed. Further, when the transmission line having no loss is applied to the optical soliton system, generation of the dispersive wave is greatly reduced. As one of conventional optical transmission lines most approaching to the transmission line having no loss, there is an optical transmission line in which loss is compensated by a Raman amplification.

A Raman amplification method utilizing Raman scattering of an optical fiber has advantages that the optical transmission line itself becomes an amplifier fiber and that any wavelength band can be amplified. In case of a silica-based optical fiber, peak of gain is generated at a long wavelength side greater than a wavelength of a pump light, i.e., in a frequency band having smaller frequency (than that of pump light) by about 13 THz. For example, 13 THz is a difference between wavelengths of 1450 nm and 1547 nm. Wavelength difference or frequency difference between the pump light and the gain peak is called as "Raman shift" which is a value depending upon composition of the optical fiber.

In general, in the Raman amplification method for communication, as shown in FIG. 21, a backward pumping scheme in which the pump light and the optical signal are propagated in opposite directions is adopted. Since a mechanism for generating Raman gain is operated at very high speed, in a forward pumping scheme in which the pump light and the optical signal are propagated in the same directions, fluctuation of intensity of the pump light is overlapped with the signal wave form as it is, with the result that the transmission property is deteriorated greatly. This is also described in Japanese Patent Application Laid-open No. 9-318981.

FIGS. 22 to 27 show general properties of intensity distribution of the pump light and optical signal along a longitudinal direction within the amplifier fiber of the Raman amplification method utilizing the conventional backward pumping scheme (regarding calculating methods, refer to "Nonlinear Fiber Optics", Chap. 8, written by G. P. Agrawal and published from Academic Press, "Applied Optics", Vol. 11, pp. 2489–2494, written by R. G. Smith and published in 1972, and "J. Quantum Electron", Vol. QE-14, pp. 347–352, written by J. Auyeung and A. Yariv and published in 1978).

As Raman amplifiers utilizing the Raman amplification method, there are a distributed type in which the optical transmission line is used as the amplifier fiber, and a lumped type in which the amplifier fiber is provided independently from the optical transmission line. In the following explanation, the distributed type will be described. However, also in the lumped type, since performance of the optical signal and pump light in the amplifier fiber can be expressed by the same formula, the same effect can be achieved, although parameter values are different.

FIG. 22 is a graph showing change in pump light power and change in optical signal power. In this graph, a curve a indicates the optical signal power when incident power of the pump light is 100 mW (curve ①), a curve b indicates the optical signal power when incident-power of the pump light is 200 mW (curve ②), and a curve c indicates the optical signal power when incident power of the pump light is 300 mW (curve ③). In the graph, a curve d indicates the optical signal power when the pump light is not inputted. As apparent from the curve d in the graph, when the pump light is not inputted, the optical signal power is attenuated in proportion to a propagating distance. When the pump light having attenuation constant of 0.25 dB/km is inputted, the Raman amplification is generated, thereby increasing the optical signal power. An increased amount of power is Raman gain. As apparent from a relationship between the curves ① to ③ and the curves a to c in the graph shown in FIG. 22, the magnitude of the Raman gain is substantially in proportion to the incident power of the pump light. Since the pump light is also attenuated in proportion to the propagating distance, in the vicinity of a signal input end, intensity of the pump light becomes small, and, thus, the Raman gain is also small. Accordingly, the optical signal is attenuated at positions near the input end, and, it is subjected to great gain in the vicinity of an output end (end on which the pump light is inputted: in this example, position spaced apart from the input end by 50 km). If the intensity of the optical signal is sufficiently small, since the attenuation of the pump light depends upon the propagation loss, the intensity distribution of the pump light along the longitudinal direction is determined reasonably by the attenuation constant of the amplifier fiber. The distribution of the Raman gain along the longitudinal direction (intensity distribution of the optical signal along the longitudinal direction) is determined in accordance with the intensity distribution of the pump light along the longitudinal direction.

FIG. 23 is a graph showing the optical signal power in a case where attenuation constant $\alpha s$ of the optical signal is changed when the incident power of the pump light is constant and attenuation constant $\alpha p$ thereof is also constant (0.25 dB/km). A curve ① in this graph indicates a case where the attenuation constant $\alpha s$ is 0.3 dB/km, a curve ② indicates a case where the attenuation constant $\alpha s$ is 0.25 dB/km, and a curve ③ indicates a case where the attenuation constant $\alpha s$ is 0.2 dB/km. As apparent from the graph shown in FIG. 23, the intensity distribution of the optical signal along the longitudinal direction within the optical transmission line is varied with the attenuation constant $\alpha s$ of the optical signal.

FIG. 24 is a graph showing change in optical signal power in a case where attenuation constant $\alpha p$ of the pump light is changed when the incident power of the pump light is constant and the attenuation constant $\alpha s$ of the optical signal is constant. A curve a in this graph indicates the optical signal power when the attenuation constant $\alpha p$ of the pump light is 0.3 dB/km (curve ①), a curve b indicates the optical signal power when the attenuation constant $\alpha p$ is 0.25 dB/km (curve ②), and a curve c indicates the optical signal power when the attenuation constant $\alpha p$ is 0.2 dB/km (curve ③). As apparent from the graph shown in FIG. 24, when the attenuation constant $\alpha p$ of the pump light is changed, since the intensity distribution of the pump light along the longitudinal direction within the optical transmission line is different, the intensity distribution of the optical signal in the same direction is changed.

FIG. 25 is a graph showing a relationship between the pump light power and the optical signal power when a length of the amplifier fiber is changed. In this case, the incident power of the pump light is constant and the attenuation constants of the optical signal and the pump light are selected to be the same. From this graph, it can be found that, when the length of the amplifier fiber is changed, since the intensity distribution of the pump light along the longitudinal direction within the optical fiber is different, the intensity distribution of the optical signal in the same direction is also changed. In the graph shown in FIG. 25, curves ① to ⑤ indicate the pump light powers when the length of the amplifier fiber is 10 km, 20 km, 30 km, 40 km and 50 km, respectively, and curves a to e indicate the optical signals powers when the length of the amplifier fiber is, 10 km, 20 km, 30 km, 40 km and 50 km, respectively.

FIG. 26 is a graph showing change in optical signal power when the incident power of the pump light is constant and the attenuation constants of the optical signal and pump light are the same and Raman gain coefficient $g_R$ of the optical signal is different. In this graph, a curve a indicates the optical signal power when the gain coefficient $g_R$ is $1/3 \times 10^{-13}$ m/W, a curve b indicates the optical signal power when the gain coefficient $g_R$ is $2/3 \times 10^{-13}$ m/W, and a curve c indicates the optical signal power when the gain coefficient $g_R$ is $1 \times 10^{-13}$ m/W. As apparent from this graph, when the magnitude of the Raman gain coefficient $g_R$ is changed, the magnitude of the Raman gain generated is changed, and the intensity distribution of the optical signal along the longitudinal direction within the optical transmission line is changed.

FIG. 27 is a graph showing change in optical signal power when the forward pumping is effected by the pump light having the constant incident power and when the backward pumping is effected. In this graph, a curve a indicates the optical signal power in the forward pumping, and a curve b indicates the optical signal power in the backward pumping. The value $g_R$ shown here is a value when the pumping wavelength is 1 $\mu$m. As apparent from this graph, if the pumping scheme is different, since the intensity distribution of the pump light along the longitudinal direction within the optical transmission line is different, the distribution of the Raman gain generated is changed, and the distribution of the optical signal is also changed. Incidentally, in the graph, a curve ① indicates power in the forward pumping and a curve ② indicates power in the backward pumping.

As general performance of a noise property of the transmission system using the optical amplifier, the fact that the noise property is greatly deteriorated by signal loss before the optical amplification. Thus, as is in the optical amplifier, when the amplifying effect has distribution along the longitudinal direction of the optical fiber, the noise property is deteriorated by loss at a position near the input end of the amplifier. On the other hand, in case of the backward pumping scheme, since the intensity of the pump light becomes smaller at the input end of the optical signal due to the propagation loss of the amplification optical fiber, the amplifying action at the input end of the optical signal also becomes small. Accordingly, in the backward pumping scheme, the loss at the input end of the optical signal becomes relatively great, which may deteriorate the noise property of the amplifier. Thus, in order to construct a Raman amplifier having good noise property, it was conventional or customary to use an optical fiber having small loss (with respect to both optical signal and pump light) as small as possible and to use an optical fiber having short length as short as possible.

On the other hand, in case of the Raman amplifier of distributed type in which the optical transmission line is used as the amplifier fiber, a high S/N ratio must be maintained while suppressing the non-linear effect in the optical transmission line. To this end, it is ideal to obtain a condition of a non-loss transmission line in which a level of the optical signal along the longitudinal direction within the optical transmission line becomes constant, and, in this case, it is desirable that intensity of the pump light also becomes constant along the longitudinal direction of the optical transmission line. However, in the prior art, a distance by which this can be achieved was relatively short and such a distance was determined reasonably by parameters (fiber length, gain coefficient, attenuation constants of the pump light and optical signal) of the optical fiber constituting the optical transmission line. The reason is that the distribution of the pump light along the longitudinal direction of the optical transmission line could not be controlled.

SUMMARY OF THE INVENTION

An object of the present invention is to provide a Raman amplification method capable of improving a noise property of an amplifier by controlling intensity distribution of pump light along a longitudinal direction of an optical transmission line and capable of realizing a condition nearer to a non-loss transmission line than conventional Raman amplification methods, and an optical signal transmission method utilizing such an amplifying method.

According to a first aspect of the present invention, there is provided a Raman amplification method utilizing Raman scattering within an optical fiber and in which first pump light for Raman-amplifying optical signal is inputted from a optical signal output end of an amplifier fiber and second pump light having a wavelength shorter than that of the first pump light and adapted to Raman-amplify the first pump light is inputted from an optical signal input end of the optical fiber.

According to a second aspect of the present invention, in the above-mentioned Raman amplification method, the second pump light is also inputted from the optical signal output end of the amplifying fiber.

According to a third aspect of the present invention, in the above-mentioned Raman amplification method, the first pump light is also inputted from the optical signal input end of the amplifier fiber.

According to fourth to ninth aspects of the present invention, in any one of the above-mentioned Raman amplification methods, the following features are incorporated. That is to say, in a Raman amplification method according to the fourth aspect, the second pump light has a wavelength shorter than a wavelength of the first pump light by an amount corresponding to Raman shift of the amplifier fiber.

In a Raman amplification method according to the fifth aspect, a Raman amplifying band of the second pump light is not overlapped with a wavelength band of the optical signal.

In a Raman amplification method according to the sixth aspect, a wavelength of the second pump light is slightly deviated from a wavelength shorter than a wavelength of the first pump light by an amount corresponding to Raman shift of the amplifier fiber.

In a Raman amplification method according to the seventh aspect, one or both of the first and second pump lights is used as a wavelength division multiplexing pump source constituted by a plurality of wavelengths.

In a Raman amplification method according to the eighth aspect, a semiconductor laser is used for the first pump light.

In a Raman amplification method according to the ninth aspect, third pump light is introduced into the optical transmission line to Raman-amplify the second pump light.

The present invention further provides a method for propagating the optical signal while maintaining a level of the optical signal to substantially constant in a longitudinal direction of the optical transmission line by using any one of the above-mentioned Raman amplification methods. The present invention still further provides an optical signal transmission method in which a soliton signal wavelength of which is multiplexed is used as the optical signal.

BEST MODE FOR CARRYING OUT THE INVENTION (First Embodiment)

Figure 1:
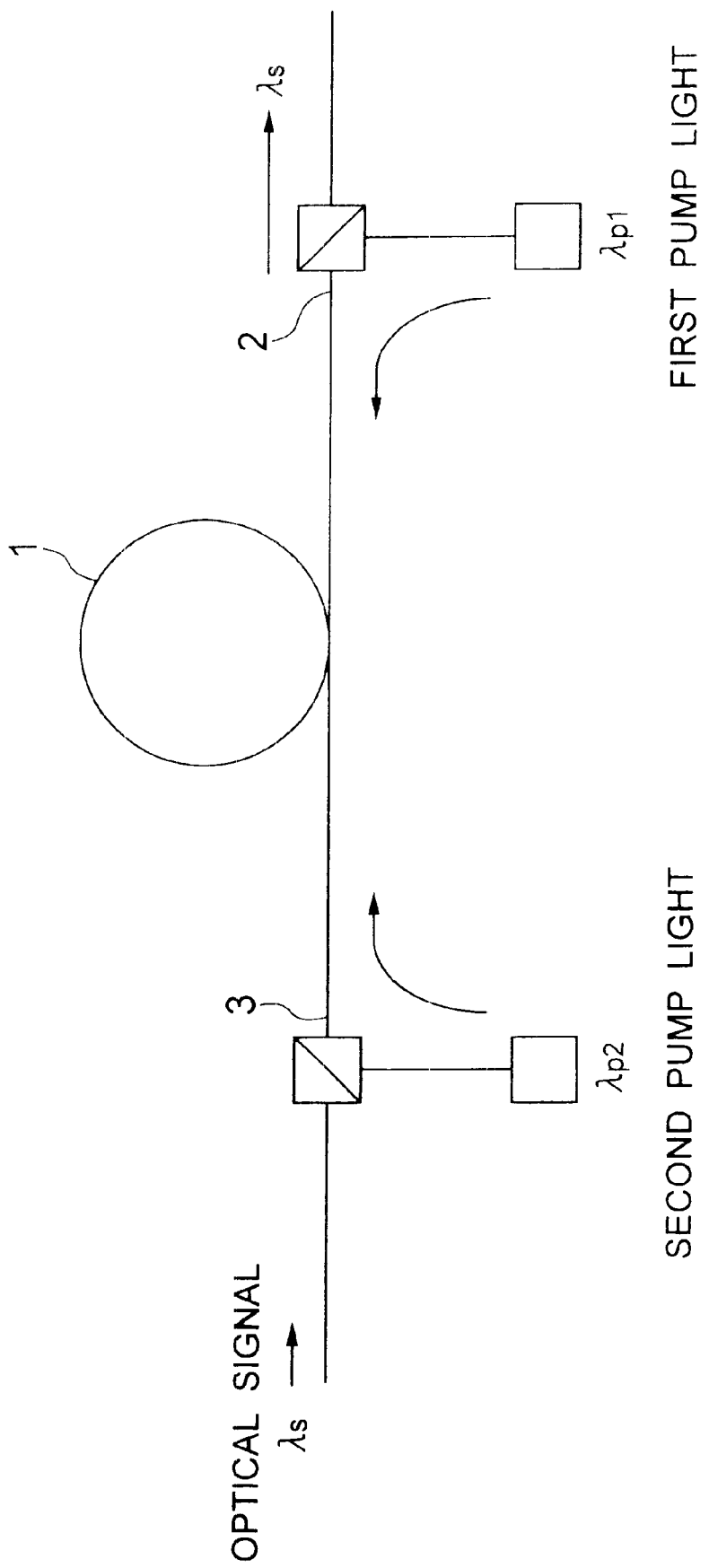
FIG. 1 is an explanatory view showing a Raman amplification method according to a first embodiment of the present invention.

A Raman amplification method according to a first embodiment of the present invention will now be fully explained with reference to FIG. 1. An optical fiber 1 shown in FIG. 1 is an optical fiber of any type which constitutes an optical transmission line or an optical amplifier of lumped type and may include, for example, SMF, DSF, NZ-DSF, LEAF, RDF, dispersion compensating fiber and non-linear device fiber. In an optical communication system using the optical fiber 1, when optical signal (having a wavelength of λs) is propagated through the optical fiber 1, first pump light (having a wavelength of $\lambda_{P1}$) is inputted from an optical signal output end 2 and second pump light (having a wavelength of $\lambda_{P2}$) is inputted from an optical signal input end 3. As a result, both the first and second pump lights are existed in the optical fiber 1, and the first pump light is amplified by Raman amplification of the second pump light, and light intensity of the first pump light in the vicinity of the optical signal input end 3 becomes greater than that when there is no second pump light. Accordingly, deterioration of an S/N ratio based on propagation loss at the optical signal input end 3 is relaxed, thereby improving a noise property of the transmission method. Further, since the second pump light is inputted from the input end 3, light intensity of the second pump light in the vicinity of the optical signal input end 3 becomes greater in comparison with the case where the second pump light is inputted from the optical signal output end 2, with the result that gain of the first pump light received from the second pump light in the vicinity of the optical signal input end 3 can be increased efficiently, thereby improving the noise property of the Raman amplifier efficiently.

In the illustrated embodiment, the wavelength $\lambda_{P2}$ of the second pump light is selected to be shorter than the wavelength $\lambda_{P1}$ of the first pump light by an amount corresponding to Raman shift of the optical fiber 1 (amplifier fiber 1). When these wavelengths have such a relationship, the first pump light is subjected to Raman amplification by the second pump light most efficiently. However, so long as the wavelength $\lambda_{P2}$ of the second pump light is shorter than the wavelength $\lambda_{P1}$ of the first pump light, since the amplification can be achieved, it is not necessarily limited that the wavelength $\lambda_{P2}$ of the second pump light is shorter than the wavelength $\lambda_{P1}$ of the first pump light by the amount corresponding to the Raman shift of the amplifier fiber 1. For example, the second pump light may have a wavelength slightly deviated from a wavelength shorter than the wavelength $\lambda_{P1}$ of the first pump light by the amount corresponding to the Raman shift of the amplifier fiber 1. If slightly deviated in this way, gain coefficient of Raman gain of the first pump light received from the second pump light can be reduced voluntarily. For example, if the wavelength is deviated from the wavelength shorter by the amount corresponding to the Raman shift by about 20 to 30 nm, the gain coefficient is reduced to about a half. This can be used as control means for controlling intensity distribution of the first pump light along a longitudinal direction of the amplifier fiber 1 and can be utilized to optimize the noise property when input and output levels of the amplifier are designated.

As explained in connection with the prior art, in the forward pumping scheme in which the pump light and the optical signal are propagated in the same direction, the unevenness of intensity of the pump light is overlapped with the signal wave form as it is, with the result that the transmission property is deteriorated greatly. Thus, it is desirable that the pump light generating the Raman gain be propagated in the direction opposite to that of the optical signal. Thus, in the illustrated embodiment, the first pump light is inputted from the optical signal output end 2 (from the direction opposite to that of the optical signal), thereby suppressing the deterioration of the transmission property.

As is in the illustrated embodiment, when the second pump light is propagated in the same direction as that of the optical signal, if the gain band is overlapped with the gain band of the optical signal, the unevenness of intensity of the pump light is overlapped with the signal wave form as it is, with the result that the transmission property is deteriorated greatly. To avoid this, in the illustrated embodiment, it is designed so that the gain bands of the second pump light and the optical signal which are propagated in the same direction are not overlapped with each other thereby to suppress the deterioration of the transmission property. For example, the wavelength of the second pump light may be spaced apart from the wavelength of the optical signal by about 20 THz.

In the transmission system using the optical amplifier, it is known that the noise property is greatly deteriorated if the optical signal is subjected to loss greater than an amplified amount after amplification of the optical signal, similar to a case where the optical signal is subjected to loss before amplification of the optical signal (refer to "Optical Amplifier and Its Applications", p 26, written by Ishio et al and published from Ohm Co.). Accordingly, when the amplifier fiber is relatively long as is in the Raman amplifier, in the view point of the noise property, it is desirable that the level of the optical signal within the optical fiber maintained as high as possible. As is in multi-stage relay effected by an amplifier of distributed type, when the input and output levels of the optical signal are substantially the same, it is desirable that the level of the optical signal through the entire optical transmission line be mainitained to be substantially the same or greater than the input and output levels. For example, as described in "Nonlinear Fiber Optics", Chap. 8, written by G. P. Agrawal and published from Academic Press, since differential coefficient of the intensity of the optical signal in the propagating direction is expressed by the following equation (1), when the gain coefficient ($g_R$) of the amplifier fiber and the loss coefficient ($\alpha_s$: attenuation constant of optical signal) are given, the intensity of the pump light for making the differential coefficient of the intensity of the optical signal in the propagating direction "zero" can be sought as $I_P = \alpha_S/g_R$. Accordingly, if the intensity of the pump light is smaller than $\alpha_{S/g_R}$, the optical signal is attenuated as it is propagated, whereas, if the intensity of the pump light is greater than $\alpha_S/g_R$, the optical signal is increased as it is propagated. Thus, although it is ideal that the intensity of the pump light is $\alpha_S/g_R$ at all positions in the optical transmission line, in actual, it is practical that the intensity is fallen within a certain range near $\alpha_S/g_R$. By doing so, the level of the optical signal along the longitudinal direction of the optical transmission line can be maintained to substantially constant, thereby obtaining good noise property.

$$dI_s/dz = (g_R I_P - \alpha_S) I_S \quad (1)$$

Figure 2:
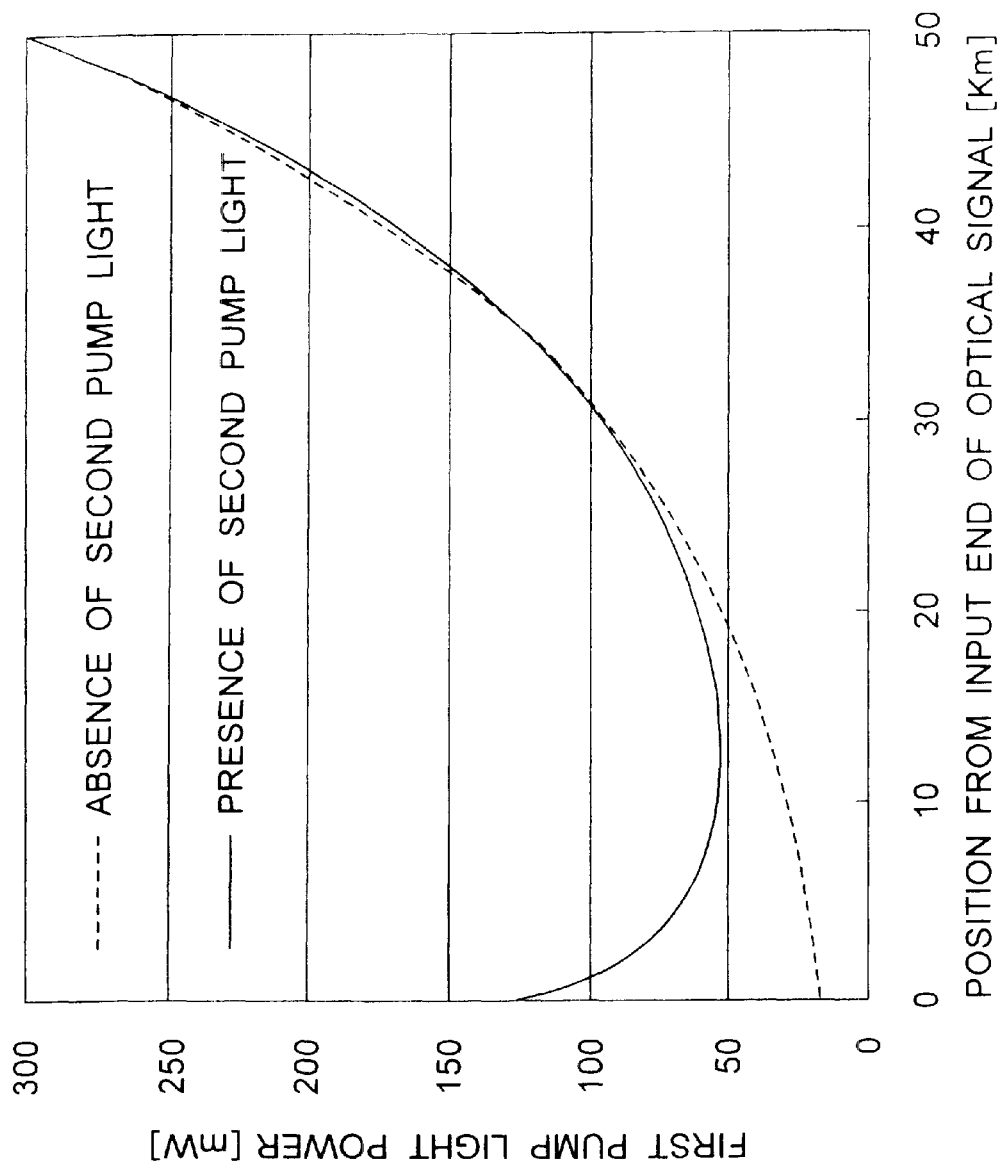
FIG. 2 is a view showing comparison result of intensity distributions of first pump light along a longitudinal direction of an optical fiber between a case where second pump light is inputted and a case where the second pump light is not inputted in the Raman amplification method shown in FIG. 1.

FIG. 2 is a graph showing comparison result of the intensity distributions of the first pump light along the longitudinal direction of the optical fiber 1 between a case where the second pump light is inputted and a case where the second pump light is not inputted in the Raman amplification method according to the first embodiment. From this graph, it can be seen that, when the second pump light is not inputted, the intensity distribution of the first pump light is attenuated in an exponential function manner by the propagation loss of the optical fiber, whereas, when the second pump light is inputted, since the first pump light is amplified, the intensity of the first pump light is increased at the optical signal input end.

Figure 3:
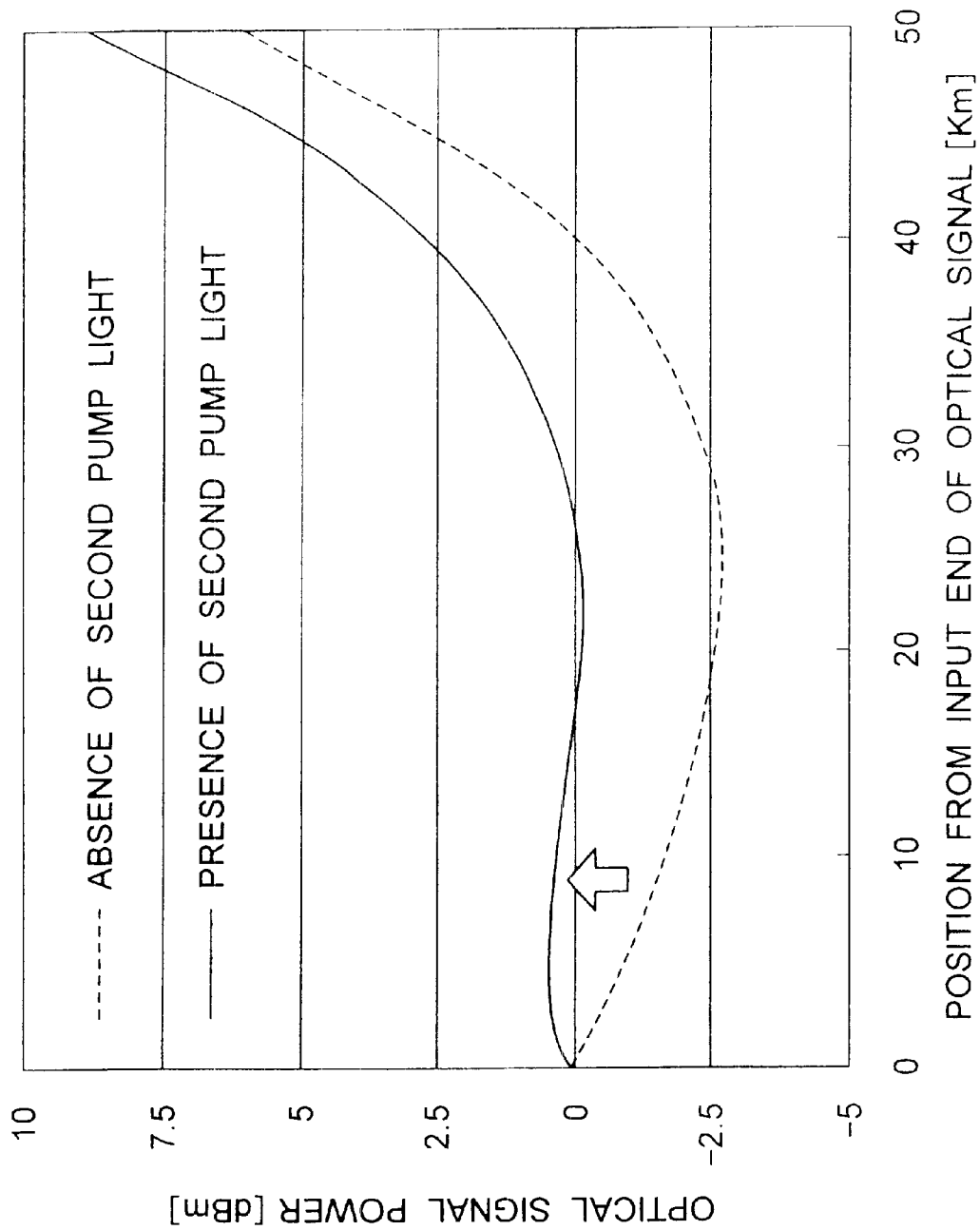
FIG. 3 is a view showing comparison result of intensity distributions of optical signal along a longitudinal direction of an optical fiber between a case where the second pump light is inputted and a case where the second pump light is not inputted in the Raman amplification method shown in FIG. 1.

FIG. 3 is a graph showing comparison result of the intensity distributions of the optical signal along the longitudinal direction of the optical fiber 1 between a case where the second pump light is inputted and a case where the second pump light is not inputted in the Raman amplification method according to the first embodiment. From this graph, it can be guessed that the intensity of the optical signal in the vicinity of the optical signal input end when the second pump light exists is greater than when the second pump light does not exist, thereby improving the noise property.

Figure 4:
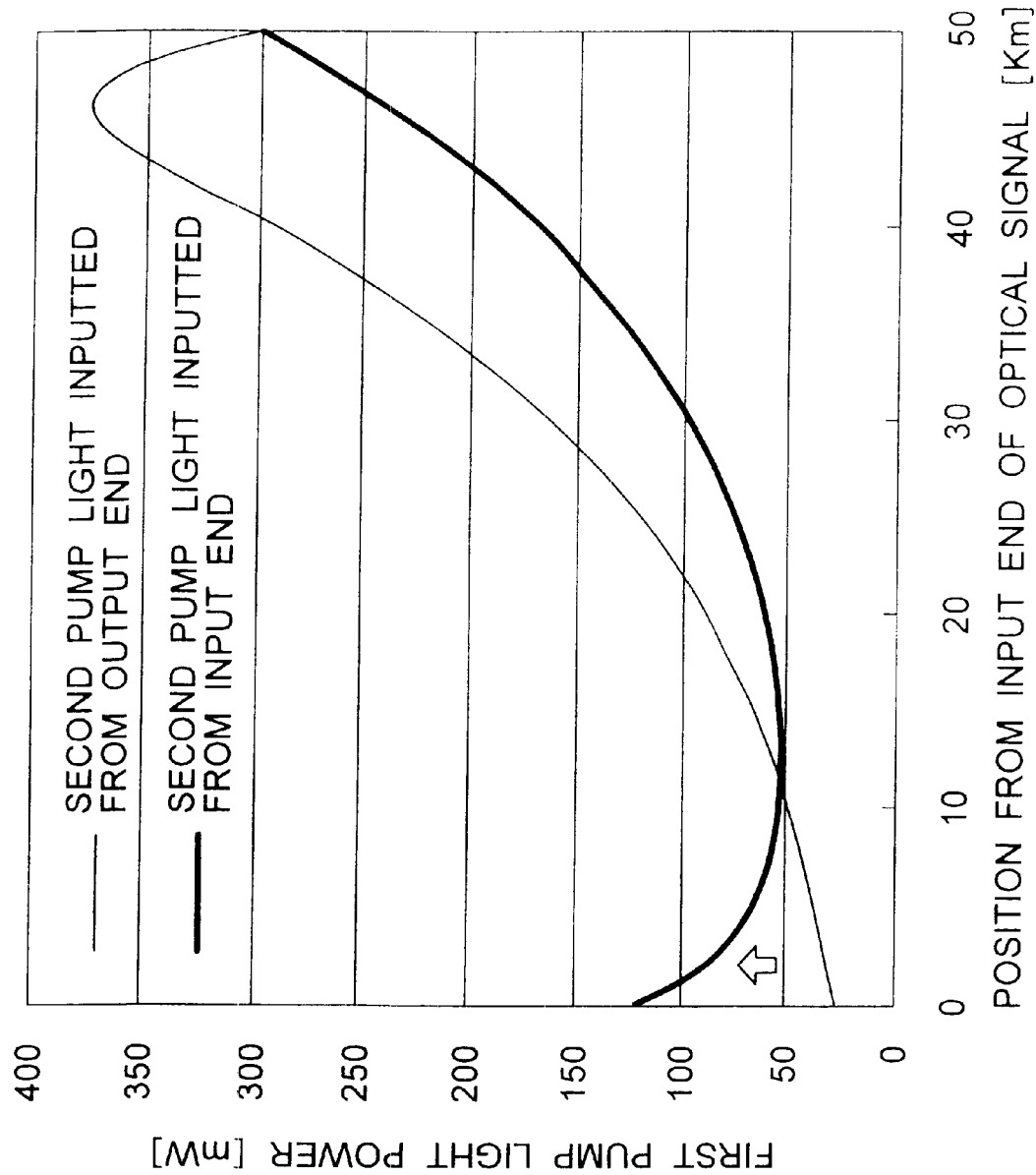
FIG. 4 is a view showing comparison result of the intensity distributions of the first pump light along the longitudinal direction of the optical fiber between a case where the second pump light is inputted from a optical signal input end and a case where the second pump light is inputted from an optical signal output end in the Raman amplification method shown in FIG. 1.

FIG. 4 is a graph showing comparison result of the intensity distributions of the first pump light along the longitudinal direction of the optical fiber 1 between a case where the second pump light is inputted from the optical signal input end ("3" in FIG. 1) and a case where the second pump light is inputted from the optical signal output end ("2" in FIG. 1) in the Raman amplification method according to the first embodiment. From this graph, it can be seen that, since the intensity of the second pump light in the vicinity of the input end 3 can be increased greater when the second pump light is inputted from the optical signal input end 3 than when the second pump light is inputted from the optical signal output end 2, the gain of the first pump light received from the second pump light in the vicinity of the input end 3 becomes great, thereby increasing the intensity of the first pump light.

Figure 5:
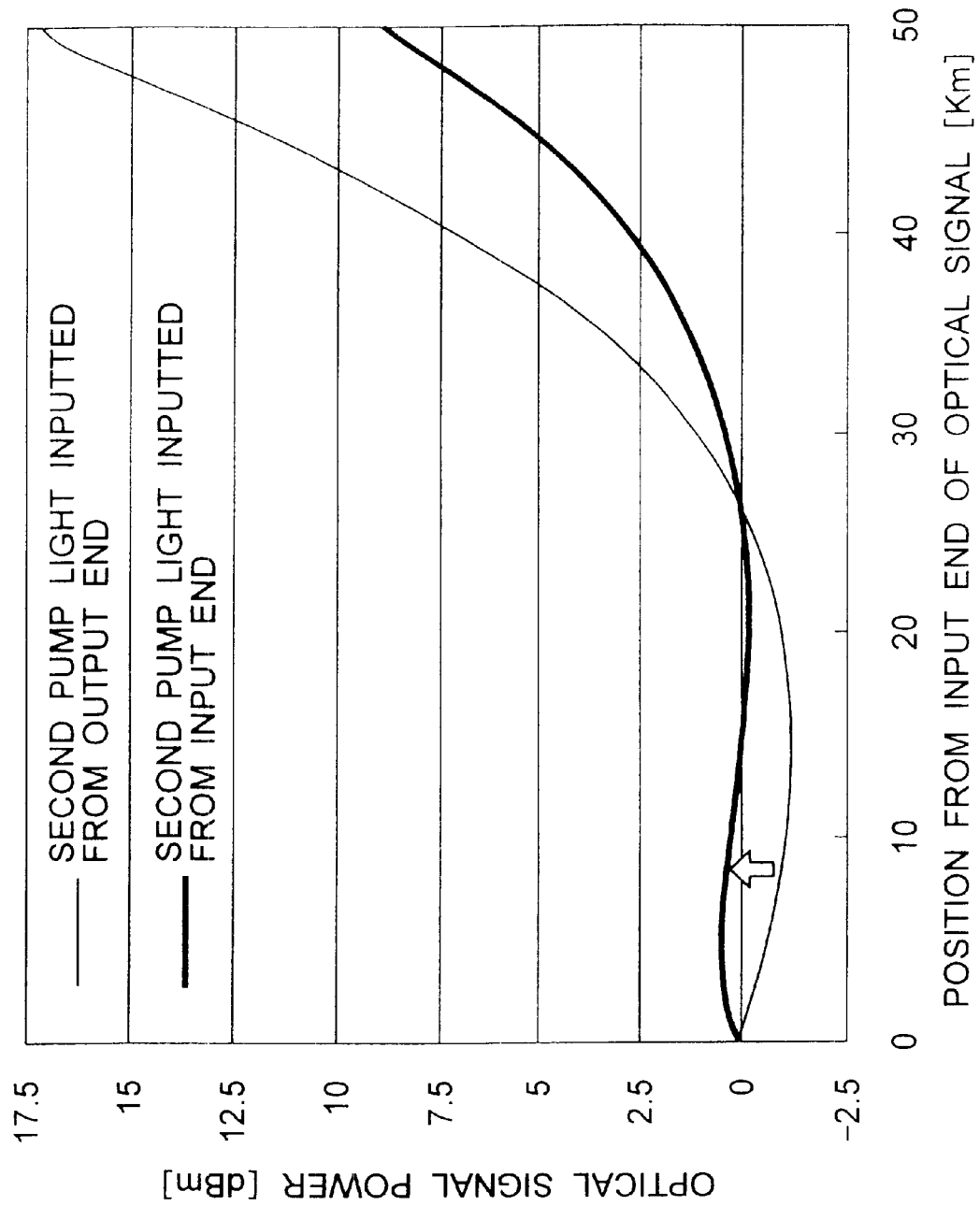
FIG. 5 is a view showing comparison result of the intensity distributions of optical signal along the longitudinal direction of the optical fiber between a case where the second pump light is inputted from the optical signal input end and a case where the second pump light is inputted from the optical signal output end in the Raman amplification method shown in FIG. 1.

FIG. 5 is a graph showing comparison result of the intensity distributions of the optical signal along the longitudinal direction of the optical fiber 1 between a case where the second pump light is inputted from the optical signal input end ("3" in FIG. 1) and a case where the second pump light is inputted from the optical signal output end ("2" in FIG. 1) in the Raman amplification method according to the first embodiment. From this graph, it can be guessed that the intensity of the optical signal in the vicinity of the optical signal input end 3 when the second pump light is inputted from the input end 3 is greater than when the second pump light is inputted from the output end 2, thereby improving the noise property.

Figure 6:
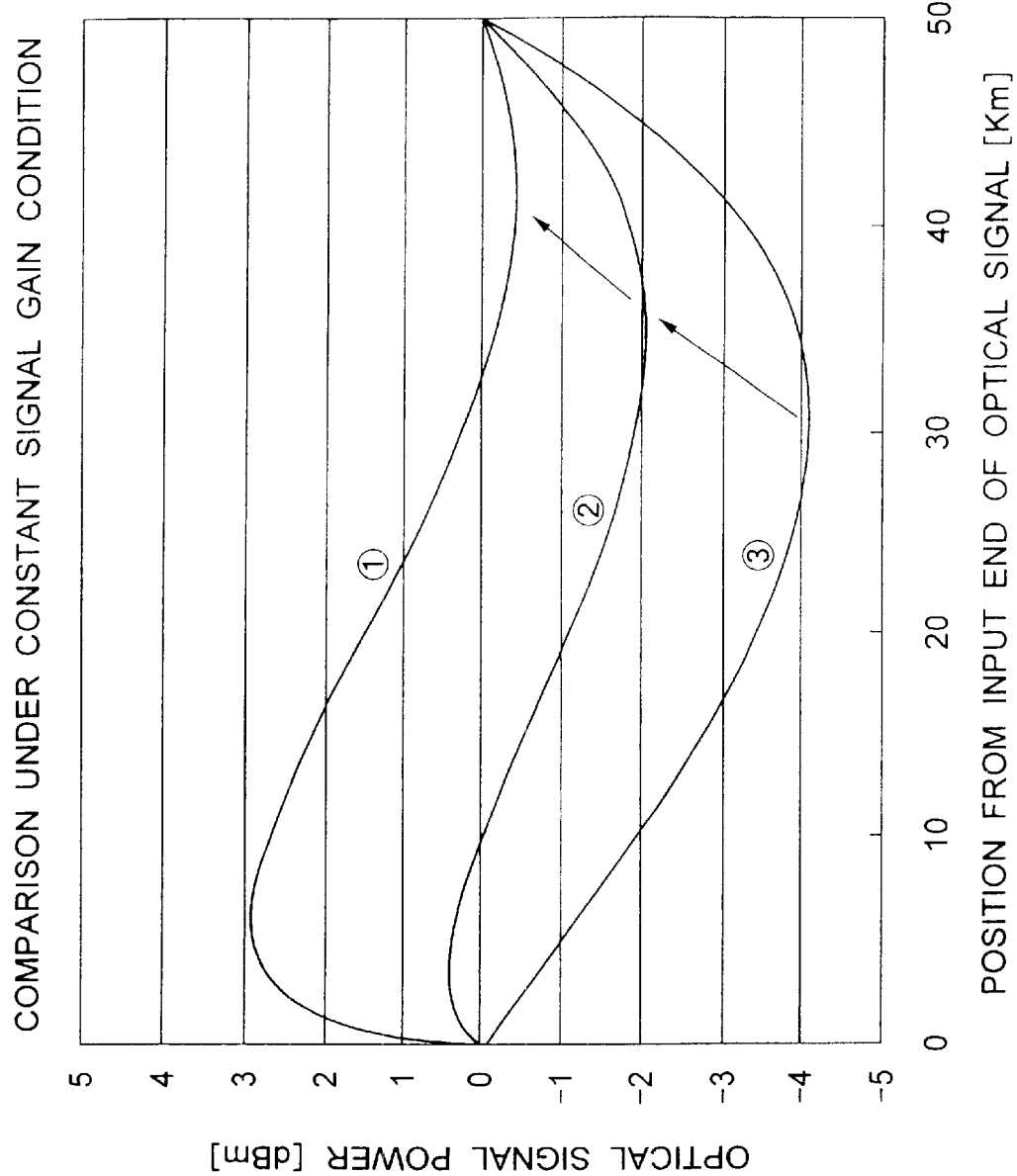
FIG. 6 is a view showing change in optical signal when a combination of the first and second pump lights is changed under a condition that gain of the signal is constant in the Raman amplification method shown in FIG. 1.

FIG. 6 is a graph showing change in optical signal power when a combination of incident powers of the first and second pump lights is changed under a condition that the gain of the optical signal is constant in the Raman amplification method according to the first embodiment. In the graph shown in FIG. 6, a curve ① indicates a case where the incident power of the first pump light is 100 mW and the incident power of the second pump light is 1100 mW, a curve ② indicates a case where the incident power of the first pump light is 150 mW and the incident power of the second pump light is 370 mW, and a curve ③ indicates a case where the incident power of the first pump light is 200 mW and the incident power of the second pump light is 0 mW. From this graph, it can be seen that the minimum level of the optical signal on the way of the optical fiber can be controlled by adjusting both powers of the first and second pump lights, and, by setting the minimum level to a high value, the noise property can be improved.

(Second Embodiment)

Figure 7:
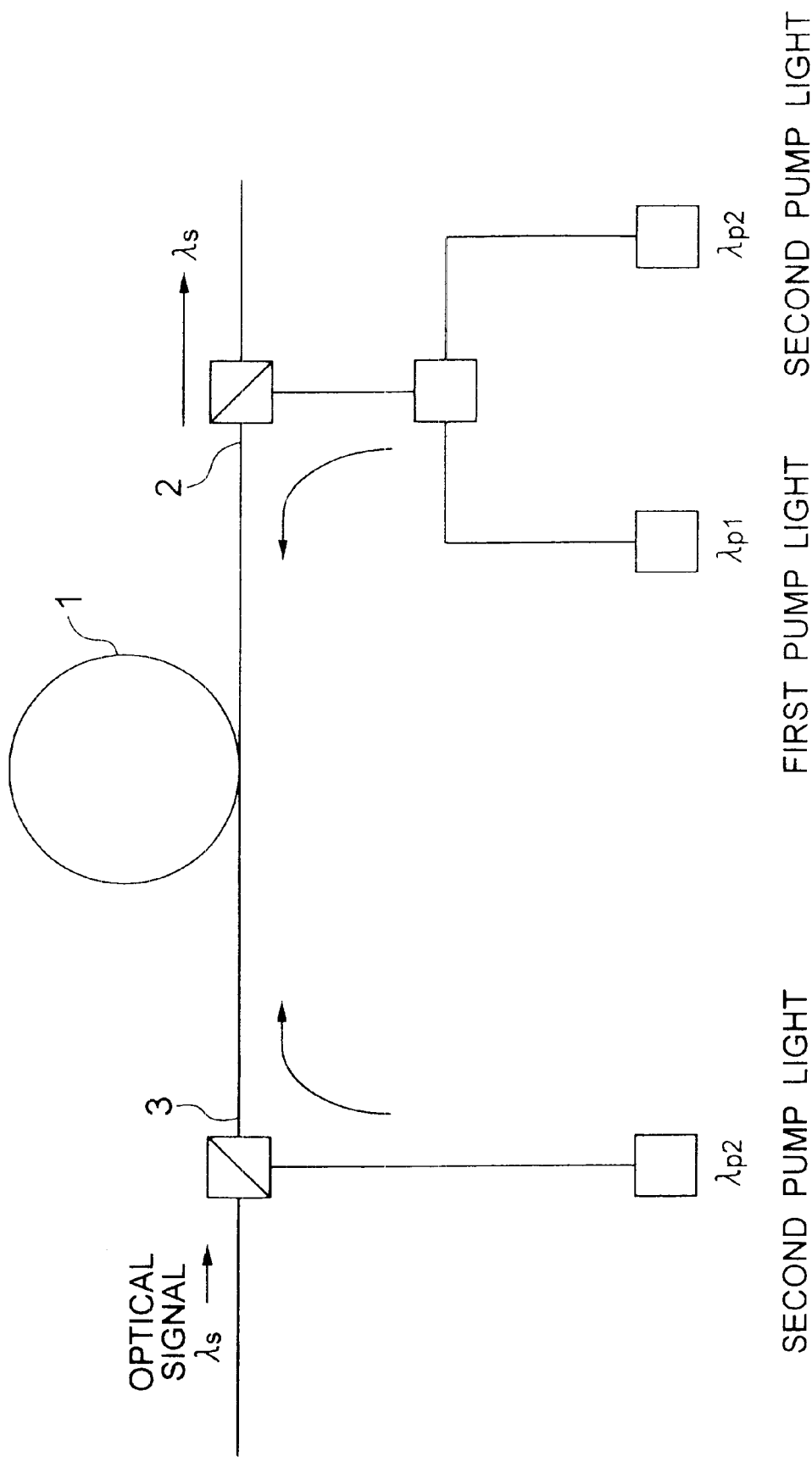
FIG. 7 is an explanatory view showing a Raman amplification method according to a second embodiment of the present invention.

Now, a Raman amplification method according to a second embodiment of the present invention will be explained with reference to FIG. 7. A fundamental construction of the second embodiment is similar to that of the first embodiment. The difference is that, as shown in FIG. 7, the second pump lights (having a wavelength of $\lambda_{P2}$) are inputted not only from the optical signal input end 3 but also from the output end 2. Also in this case, similar to the first embodiment, the wavelength $\lambda_{P2}$ of the second pump light can be selected to be shorter than the wavelength $\lambda_{P1}$ of the first pump light or can be selected to a wavelength shorter than the wavelength $\lambda_{P1}$ of the first pump light by an amount corresponding to Raman shift of the optical fiber 1 (amplifier fiber 1) or can be selected to a wavelength slightly deviated from the wavelength shorter than the wavelength $\lambda_{P1}$ of the first pump light by the amount corresponding to the Raman shift of the amplifier fiber 1.

When the second pump light (having a wavelength of $\lambda_{P2}$) is also inputted from the optical signal output end 2, a degree of freedom in controlling the intensity distribution of the first pump light (having a wavelength of $\lambda_{P1}$) along the longitudinal direction of the optical fiber 1 can be increased, with the result that the intensity distribution of the optical signal along the longitudinal direction of the optical fiber 1 can easily be controlled. As is in the multistage relay effected by the amplifier of distributed type, in a case where the noise property is optimized under a condition that the input and output levels of the optical signal are to be regulated, this method achieves excellent effect.

Figure 8:
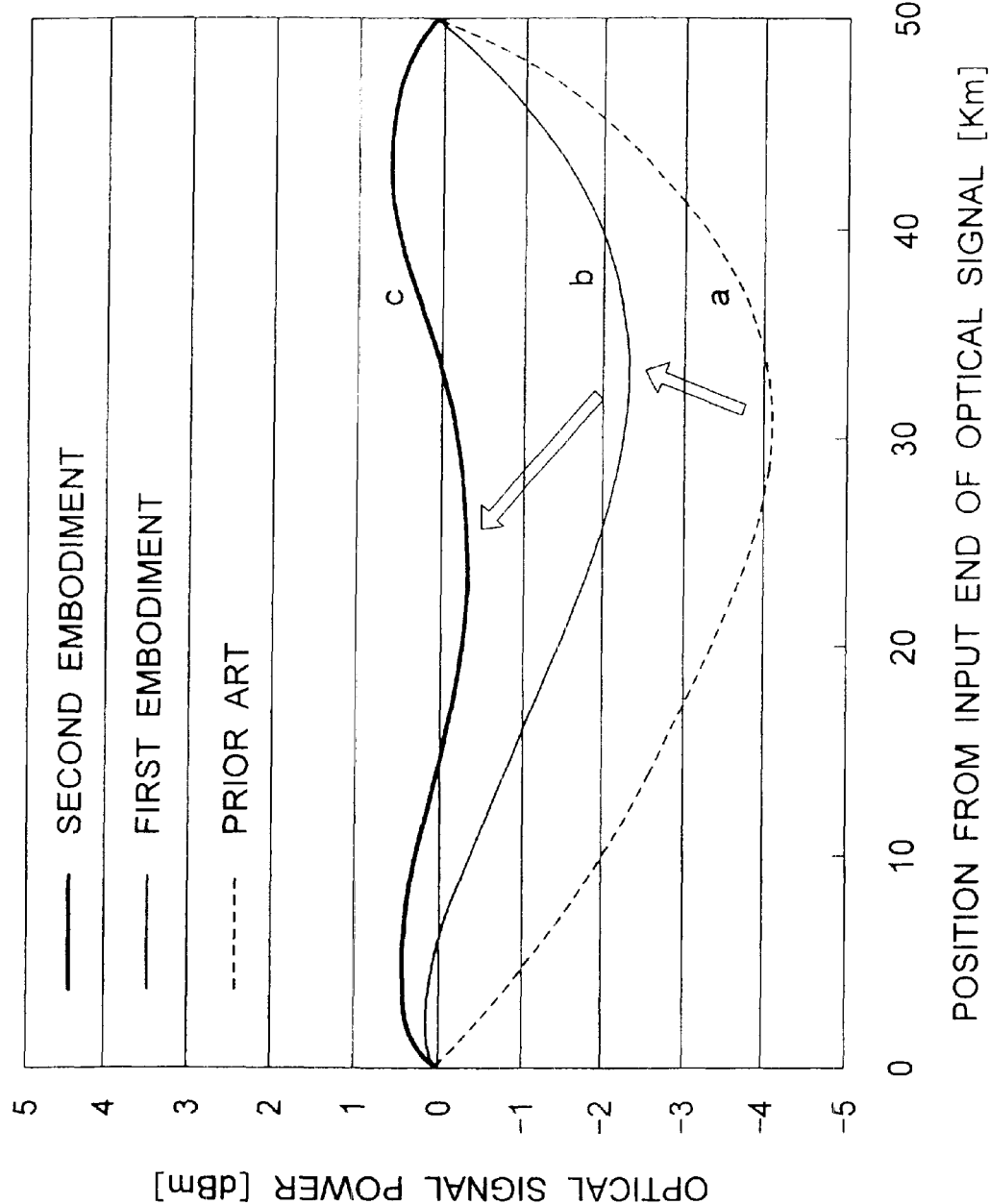
FIG. 8 is a view showing intensity distribution of the optical signal in the Raman amplification methods shown in FIGS. 1 and 7 and in a conventional Raman amplification method.
Figure 9:
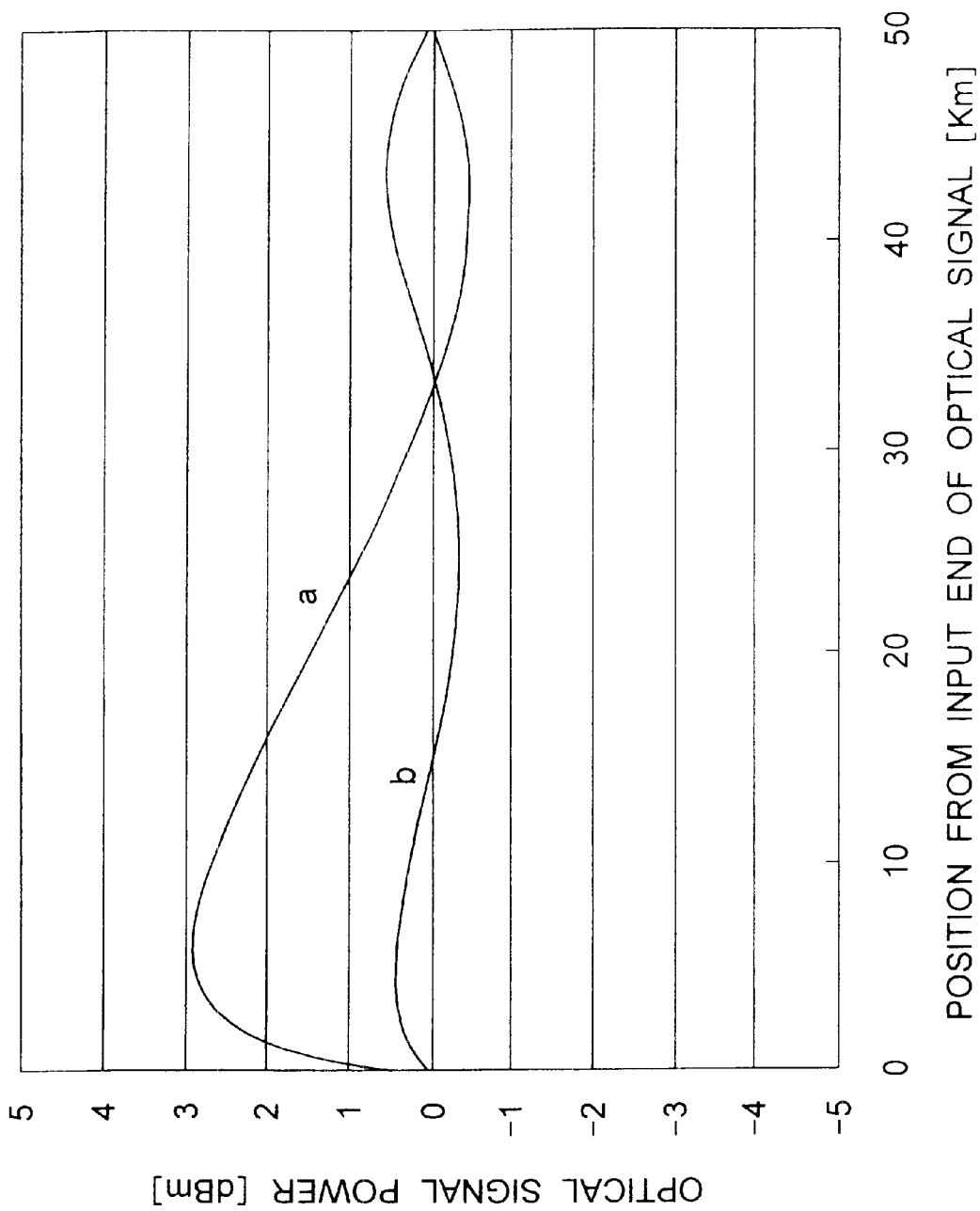
FIG. 9 is a view showing pump power required for making minimum levels of the optical signals equal in the Raman amplification methods shown in FIGS. 1 and 7.

FIG. 8 is a graph showing intensity distribution of the optical signal along the longitudinal direction of the optical fiber 1 shown in FIG. 7. In this graph, a curve a indicates the intensity distribution of the optical signal when the optical signal in the optical fiber 1 is amplified by a conventional Raman amplification method, a curve b indicates the intensity distribution of the optical signal when the optical signal is amplified by the Raman amplification method according to the first embodiment of the present invention, and a curve c indicates the intensity distribution of the optical signal when the optical signal is amplified by the Raman amplification method according to the second embodiment of the present invention. From this graph, it can be seen that, since the minimum level of the optical signal on the way of the optical fiber 1 is greater when the Raman amplification method according to the first embodiment in comparison with the conventional amplifying method, good noise property can be obtained. Further, when the Raman amplification method according to the second embodiment is used, the minimum level of the optical signal is maintained to a higher value in comparison with the Raman amplification method according to the first embodiment, with the result that the noise property is further improved. Also in the Raman amplification method according to the first embodiment, by adjusting the intensities of the first and second pump lights, the minimum level of the optical signal can be made equal to that in the Raman amplification method according to the second embodiment. However, in an example shown in FIG. 9, since pump power required in total is smaller when the Raman amplification method according to the second embodiment is used, more excellent efficiency can be obtained. FIG. 9 is a graph showing comparison result of optical signal powers between a case where the Raman amplification method according to the first embodiment is used and a case where the Raman amplification method according to the second embodiment is used. In this graph, a curve a indicates the optical signal power when the first pump light is 100 mW and the second pump light is 1100 mW in the Raman amplification method according to the first embodiment, and a curve b indicates the optical signal power when the first pump light is 25 mW and the second pump light is 300 mW×2 in the Raman amplification method according to the second embodiment.

Figure 10:
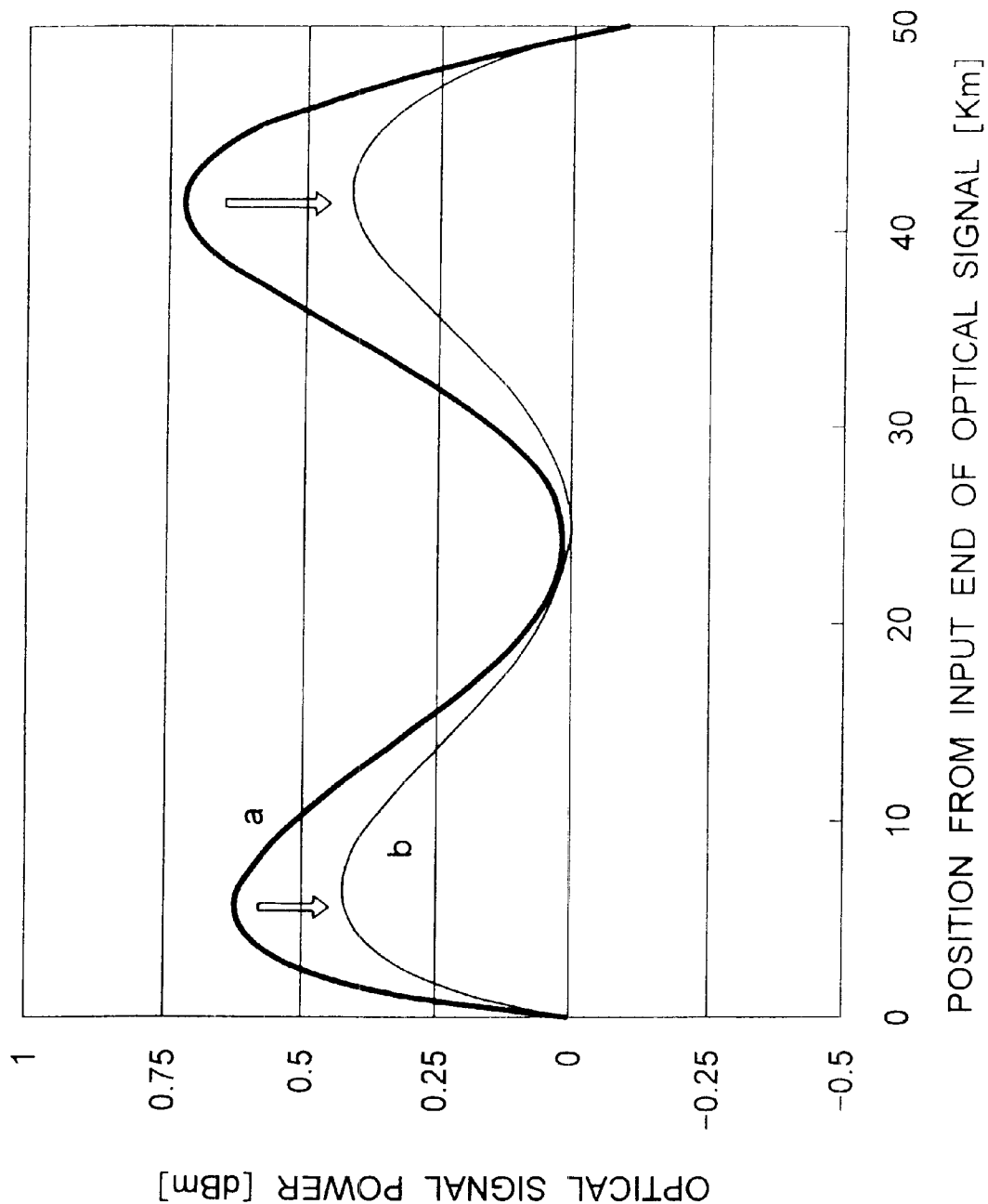
FIG. 10 is a view showing the intensity distribution of the optical signal when wavelength intervals of the first and second pump lights are differentiated under a condition that input and output levels and minimum level of the optical signal become equal in the Raman amplification method shown in FIG. 1.
Figure 11:
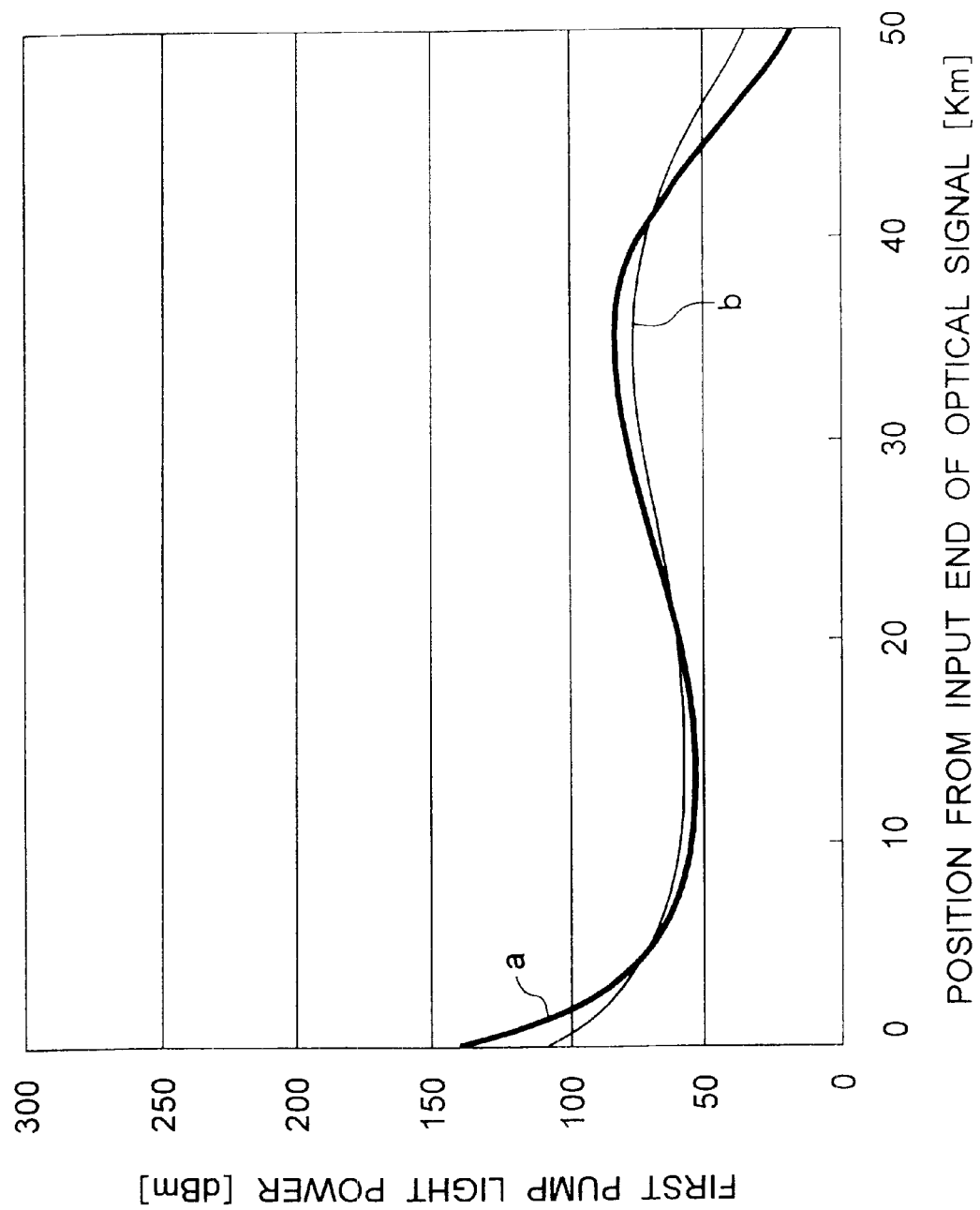
FIG. 11 is a comparison view showing the intensity distribution of the first pump light along the longitudinal direction of the optical fiber under the same condition as that of FIG. 10.

FIG. 10 is a graph showing comparison result of the intensity distributions of the optical signal along the longitudinal direction of the optical fiber when wavelength intervals of the first and second pump lights are differentiated under a condition that the input and output levels and minimum level of the optical signal become equal in the Raman amplification method according to the second embodiment. In this graph, a curve a indicates a case where the wavelength $\lambda_{P1}$ of the first pump light is 1450 nm and the wavelength $\lambda_{P2}$ of the second pump light is 1350 nm (i.e,. when the wavelength intervals are Raman shift), and a curve b indicates a case where the wavelength $\lambda_{P1}$ of the first pump light is 1450 nm and the wavelength $\lambda_{P2}$ of the second pump light is 1325 nm (i.e,. when the wavelength intervals are deviated from Raman shift). From the graph, it can be seen that the maximum level of the optical signal can be reduced by deviating the wavelength intervals of the first and second pump lights from the Raman shift, thereby reducing the deterioration of the transmission property due to non-linearity in the optical fiber. The reason is that, since the gain coefficient to which the first pump light is subjected becomes small, the intensity distribution of the first pump light along the longitudinal direction of the optical fiber becomes gentle, with the result that the intensity distribution of the optical signal along the longitudinal direction of the optical fiber also becomes gentle. FIG. 11 is a graph showing the intensity distribution of the first pump light under the condition shown in FIG. 10. In this graph, a curve a indicates the intensity distribution of the first pump light when the wavelength $\lambda_{P1}$ of the first pump light is 1450 nm and the wavelength $\lambda_{P2}$ of the second pump light is 1350 nm, and a curve b indicates the intensity distribution of the first pump light when the wavelength $\lambda_{P1}$ of the first pump light is 1450 nm and the wavelength $\lambda_{P2}$ of the second pump light is 1325 nm. From this graph, it can be seen that the intensity distribution of the first pump light along the longitudinal direction of the optical fiber becomes gentle by deviating the wavelength intervals of the first and second pump lights from the Raman shift.

In the Raman amplification method according to the second embodiment, while an example that the second pump lights having the same wavelength ($\lambda_{P2}$) are inputted from the optical signal input end 3 and optical signal output end 2 was explained, it is not necessary that two second pump lights inputted from the optical signal input end 3 and optical signal output end 2 have the same wavelength and/or the same power. Such wavelength and/or power can be appropriately adjusted in accordance with the intensity distribution of the optical signal to be achieved along the longitudinal direction of the optical fiber.

(Third Embodiment)

Figure 12:
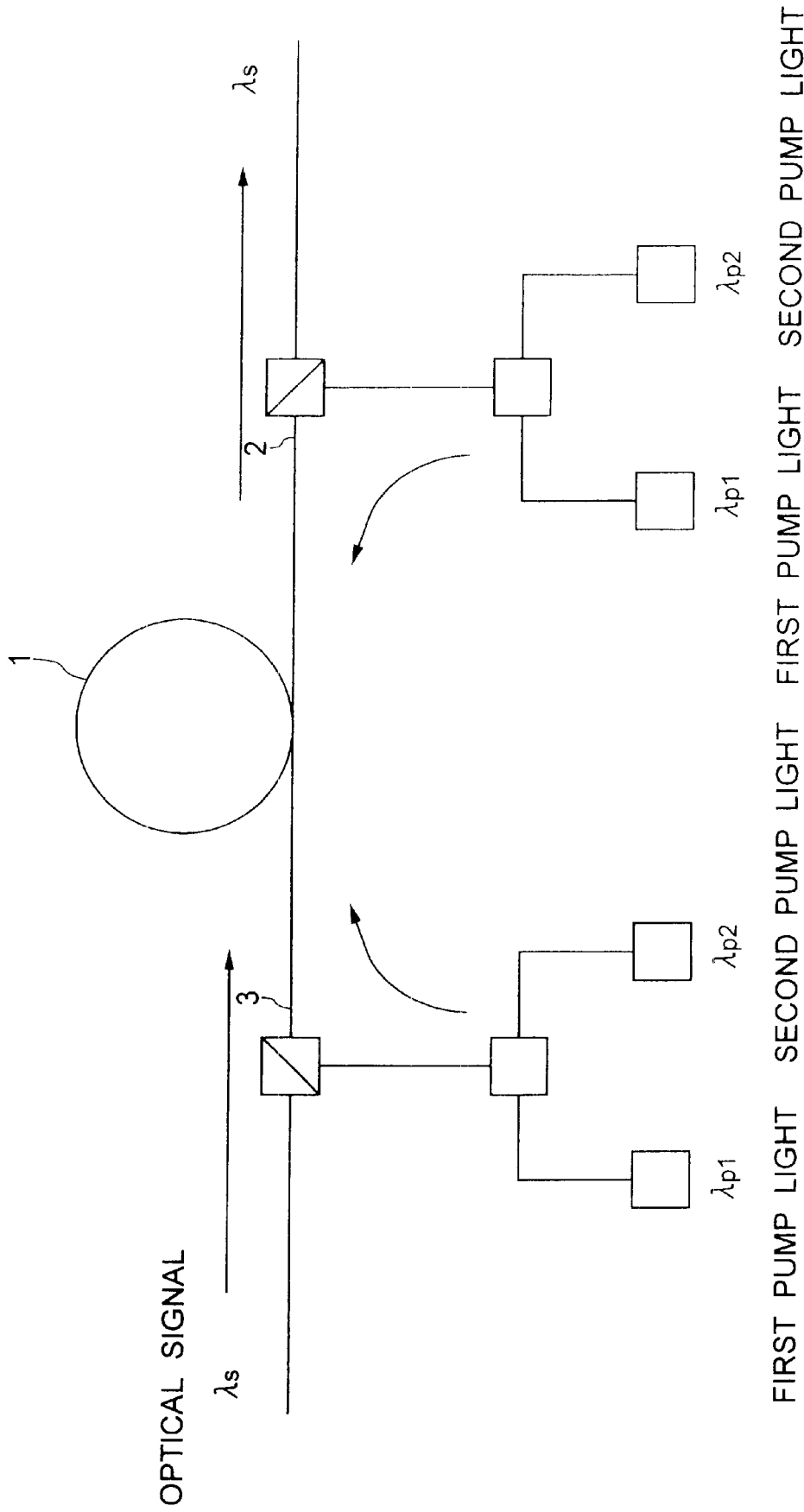
FIG. 12 is an explanatory view showing a Raman amplification method according to a third embodiment of the present invention.

A Raman amplification method according to a third embodiment of the present invention will now be explained with reference to FIG. 12. A fundamental construction of the third embodiment is similar to that of the second embodiment. The difference is that, as shown in FIG. 12, the first pump lights (having a wavelength of $\lambda_{P1}$ are inputted not only from the optical signal output end 2 but also from the input end 3. Also in this case, similar to the first and second embodiments, the wavelength $\lambda_{P2}$ of the second pump light can be selected to be shorter than the wavelength $\lambda_{P1}$ of the first pump light or can be selected to a wavelength shorter than the wavelength $\lambda_{P1}$ of the first pump light by an amount corresponding to Raman shift of the optical fiber 1 (amplifier fiber 1) or can be selected to a wavelength slightly deviated from the wavelength shorter than the wavelength $\lambda_{P1}$ of the first pump light by the amount corresponding to the Raman shift of the optical fiber 1.

When the first pump light (having a wavelength of $\lambda_{P1}$) is also inputted from the optical signal input end 3, since the intensity distributions of the first pump light (having a wavelength of $\lambda_{P1}$) and the second pump light (having a wavelength of $\lambda_{P2}$) along the longitudinal direction of the optical fiber can be made more uniform, a condition near the non-loss transmission line is apt to be realized. However, since the first pump light is propagated in the same direction as the optical signal, it is required that the light source for the first pump light inputted from the input end 3 be constituted by a semiconductor laser having less intensity noise and the like.

Figure 13:
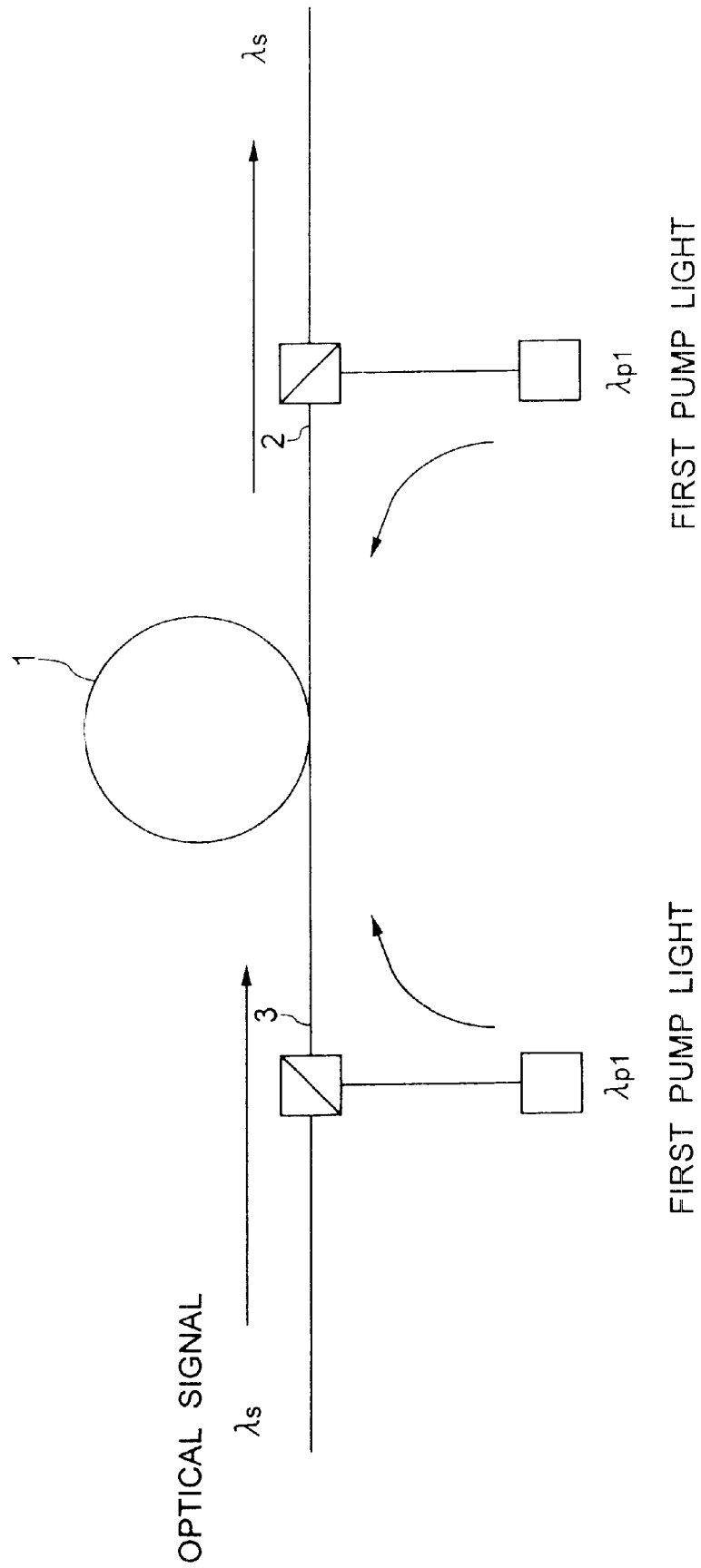
FIG. 13 is a view showing a conventional Raman amplification method nearest to the Raman amplification method shown in FIG. 12.

FIG. 13 shows a conventional arrangement nearest to the Raman amplification method according to the third embodiment. In the Raman amplification method shown in FIG. 13, similar to the Raman amplification method according to the third embodiment of the present invention, since the first pump light is propagated in the same direction as the optical signal, it is required that the light source for the first pump light inputted from the input end 3 be constituted by a semiconductor laser having less intensity noise and the like.

Figure 14:
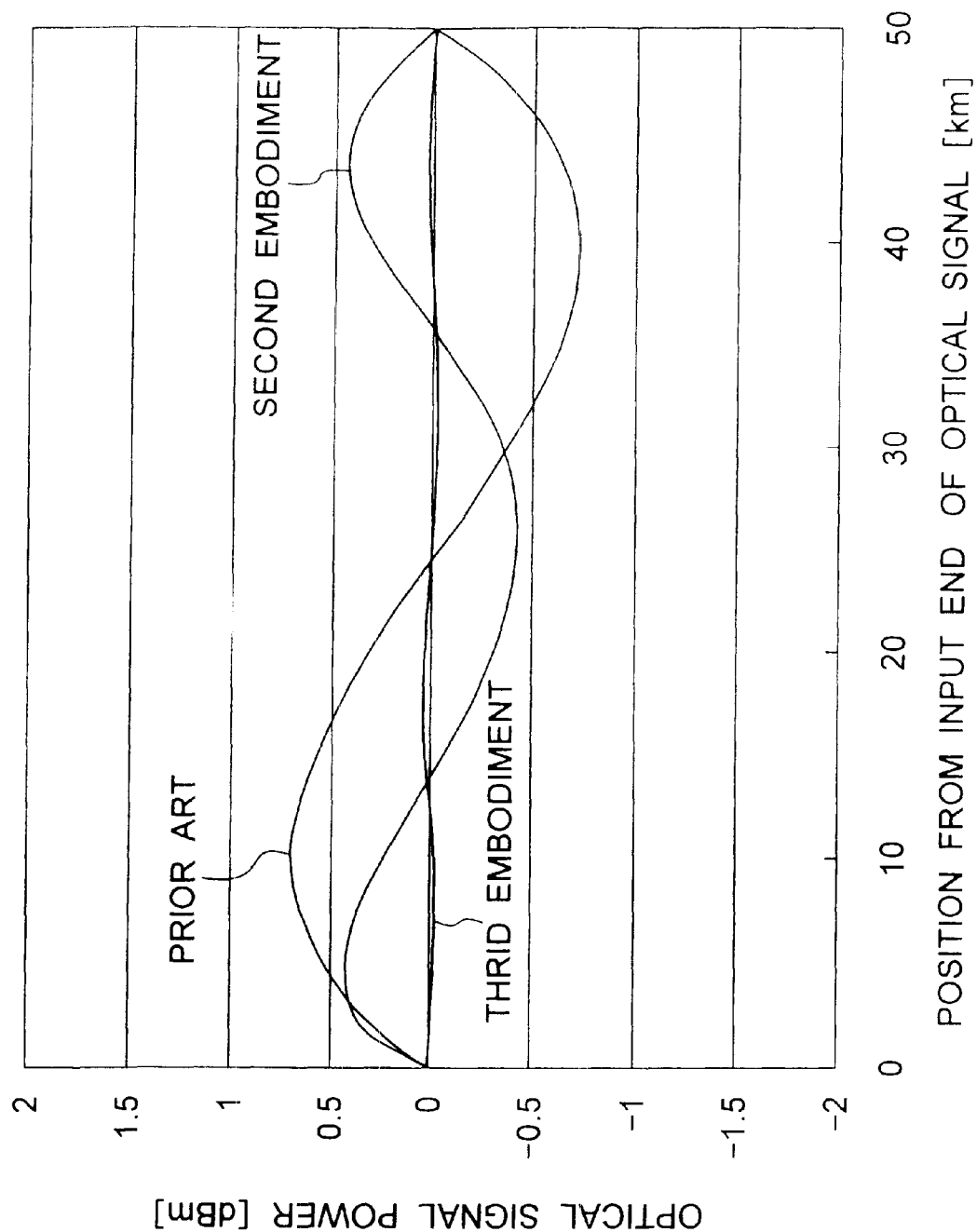
FIG. 14 is a view showing intensity distribution of optical signal along a longitudinal direction of an optical fiber.

FIG. 14 is a graph showing intensity distribution of the optical signal along the longitudinal direction of the optical fiber 1 when the conventional Raman amplification method is used and when the Raman amplification method according to the second embodiment is used and when the Raman amplification method according to the third embodiment is used, respectively. Incidentally, in any cases, the power of the pump light is optimized so that the level variation width of the optical signal becomes minimum. As apparent from this graph, by using the Raman amplification method according to the third embodiment of the present invention, the level variation width of the optical signal in the longitudinal direction of the optical fiber 1 can be reduced considerably.

Figure 15:
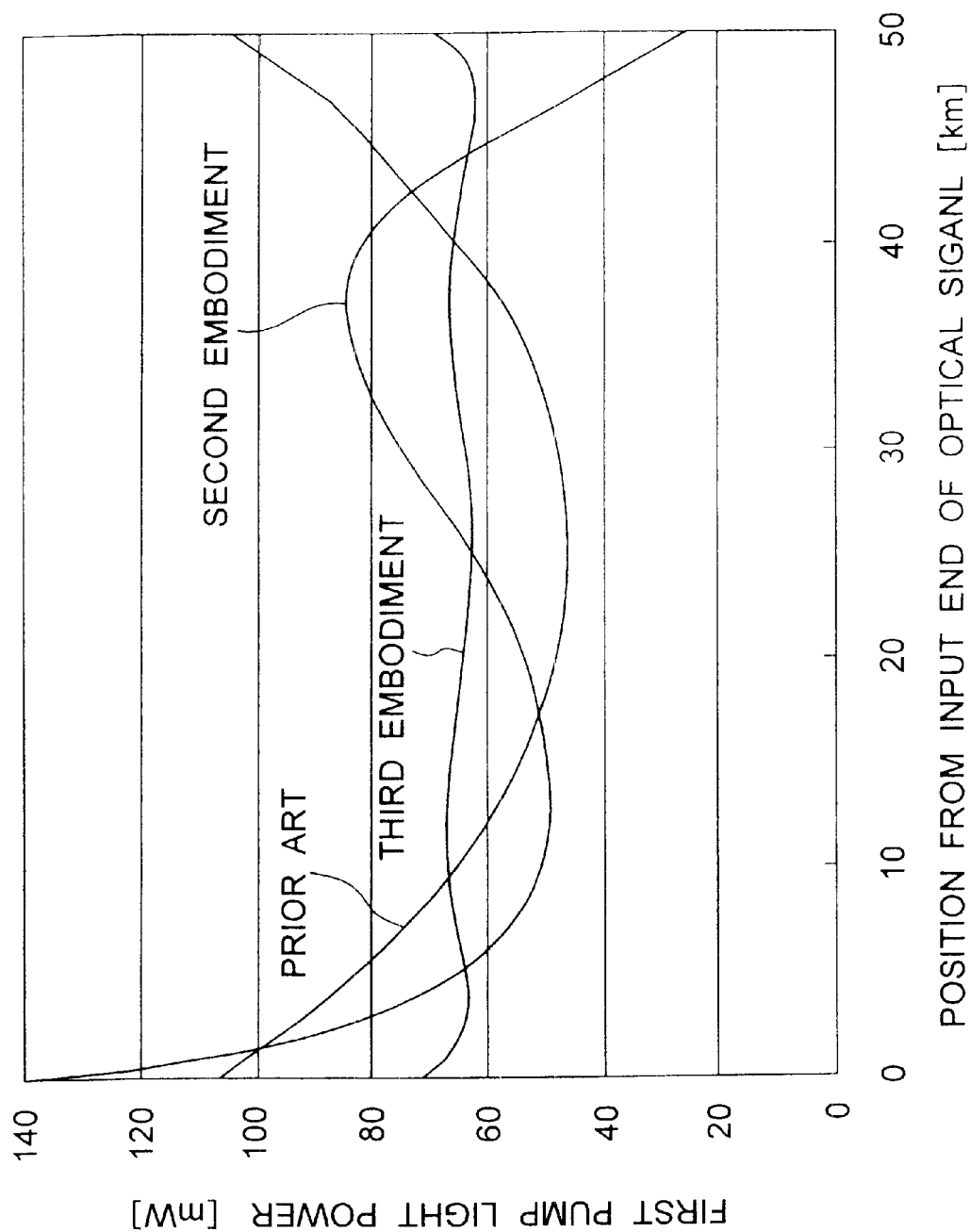
FIG. 15 is a view showing intensity distribution of first pump light along the longitudinal direction of the optical fiber under the same condition as FIG. 14.

FIG. 15 is a graph showing the intensity distribution of the first pump light along the longitudinal direction of the optical fiber 1 under the condition shown in FIG. 14. From this graph, it can be seen that the reason why the level variation of the optical signal is small in the Raman amplification method according to the third embodiment is that the level variation of the first pump light is small.

Figure 16:
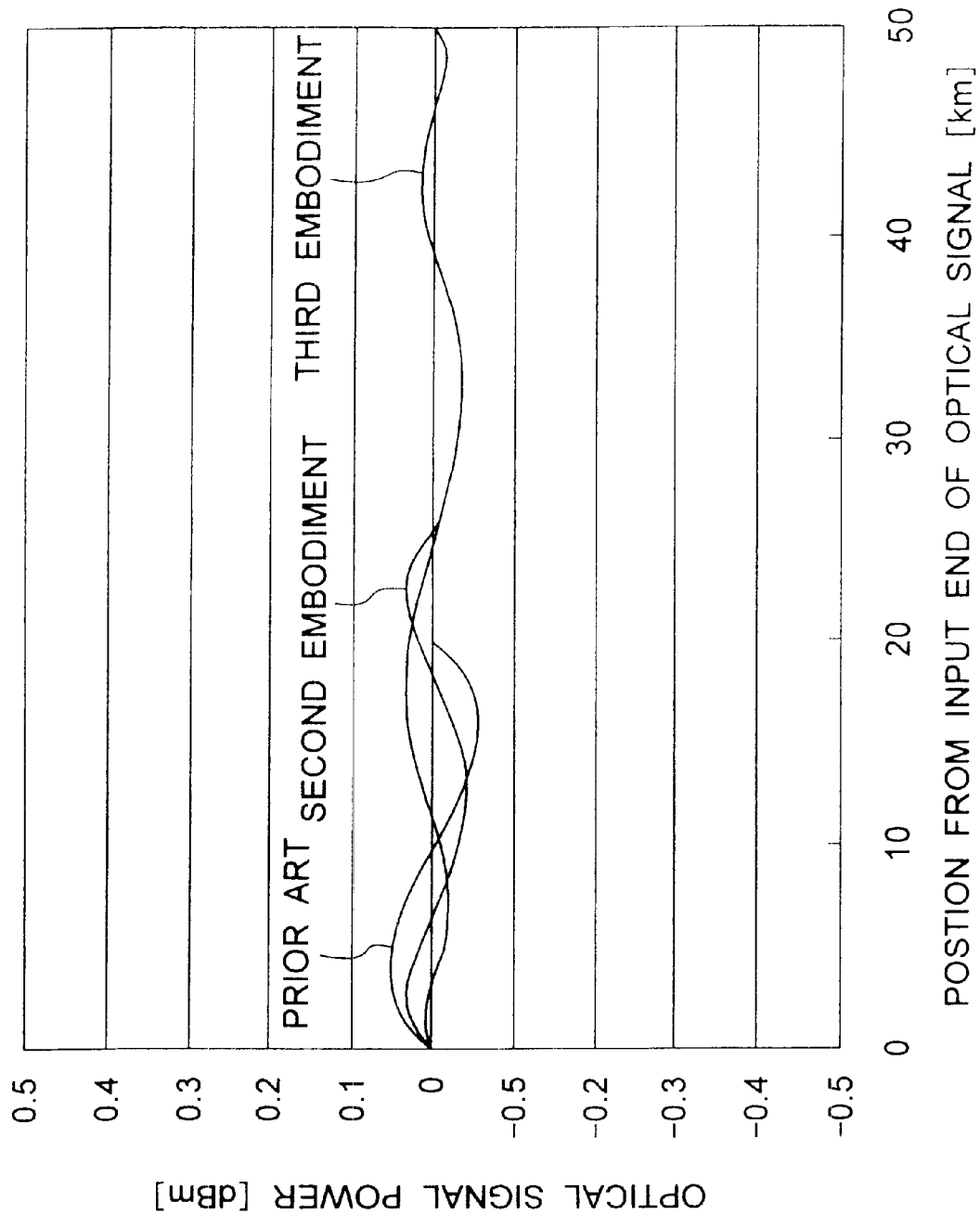
FIG. 16 is a view showing difference in relay distance when level variation widths of optical signals are set to be substantially the same.

FIG. 16 is a graph showing comparison of difference in relay distance when the level variation widths of the optical fiber are set to be substantially the same. From this graph, it can be seen that, in order to realize the variation width same as the level variation width (FIG. 14) of the optical signal realized in the Raman amplification method according to the third embodiment, the relay distance must be shortened to 20 km in the conventional Raman amplification method and be shortened to 25 km in the Raman amplification method according to the second embodiment.

(Fourth Embodiment)

In order to optimize the noise property, it is desirable to achieve high output of the pump light of the Raman amplifier and it is advantageous that the power ranges of the first and second pump lights are great. In this case, one or both pump lights can be obtained from a wavelength division multiplexing pump light source constituted by a pumping semiconductor laser having a plurality of oscillating wavelengths (for example, refer to "Electronics Letters", vol. 34, pp. 2145-2146, written by Y. Emori et al and published in 1998). When such a pump source is used, it is required that the wavelength of the pump source be selected so that the peak wavelength of gain coincides with the wavelength of the optical signal. For example, when a pump source multiplexing wavelengths 1435 nm, 1450 nm, 1465 nm and 1480 nm is used, since the gain peak wavelength is located in the vicinity of the wavelength of 1570 nm, it is so set that the wavelength of the optical signal is included within such wavelength band.

When the wavelength division multiplexing pump source is used, there arises a phenomenon in which the effective gain coefficient is changed in the longitudinal direction of the optical fiber. Regarding this, although the gain coefficient in the optical signal wavelength becomes the sum of coefficients based on the respective pump lights, since attenuation ratios of the respective pump lights are different, the performance will differ from that when the multiplexing is not effected. The reason why the attenuation ratios are different is based upon the wavelength dependency of the loss coefficient and Raman amplification effect between the pump lights. Accordingly, by appropriately selecting the wavelengths to be multiplexed, the distribution of the gain coefficient along the longitudinal direction of the optical fiber can be controlled.

(Fifth Embodiment)

When the wavelength division multiplexing pump light is used as the first pump light for Raman-amplifying the optical signal, since the Raman effects are generated between the respective pump lights, the attenuation ratio of the pump light having short wavelength becomes greater than that of the pump light having long wavelength (refer to "Photonics Technology Letters", pp. 530-532, vol. 11, FIG. 5, written by H. Kidorf et al). Thus, the noise property of the wavelength band to which the gain is subjected from the pump light having short wavelength is worsened more than the wavelength band to which the gain is subjected from the pump light having long wavelength. For example, if a C-band (1530-1565 nm) and an L-band (1570-1610 nm) are Raman-amplified simultaneously, although pump light having wavelength near 1450 nm and pump light having wavelength near 1490 nm are used, due to the Raman effect between the pump lights, the attenuation ratio of the pump light having wavelength of about 1450 nm becomes greater than the other, with the result that the noise property of the C-band becomes worse more than that of the L-band. In this case, by setting the wavelength of the second pump light so that the gain for the pump light having wavelength of about 1450 nm becomes greater than the gain for the pump light having wavelength of about 1490 nm, effect for improving the noise property of the C-band can be greater than effect for improving the noise property of the L-band. As a result, it is possible to eliminate a difference in noise property between the C-band and the L-band.

Figure 17:
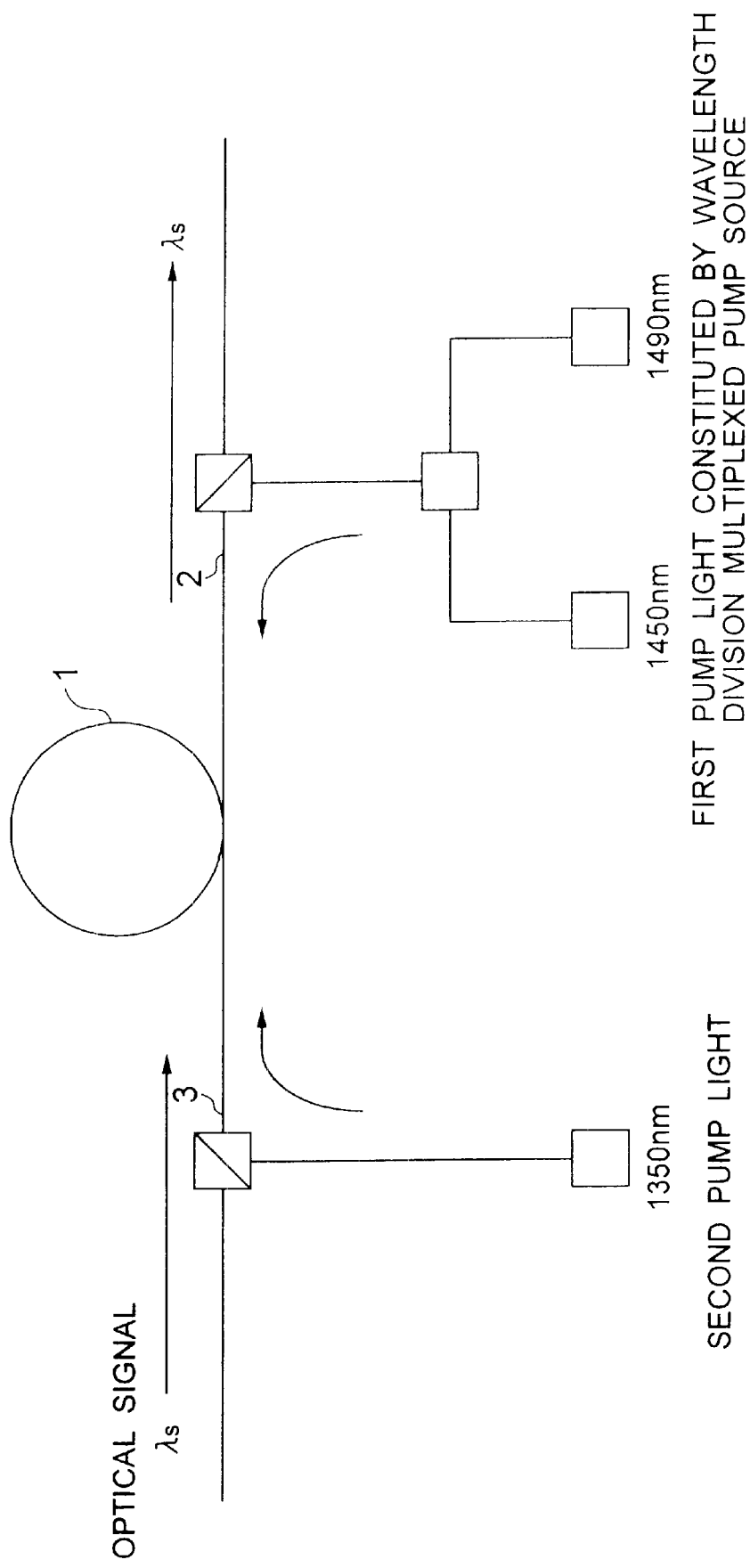
FIG. 17 is an explanatory view showing a Raman amplification method according to a fifth embodiment of the present invention.
Figure 18:
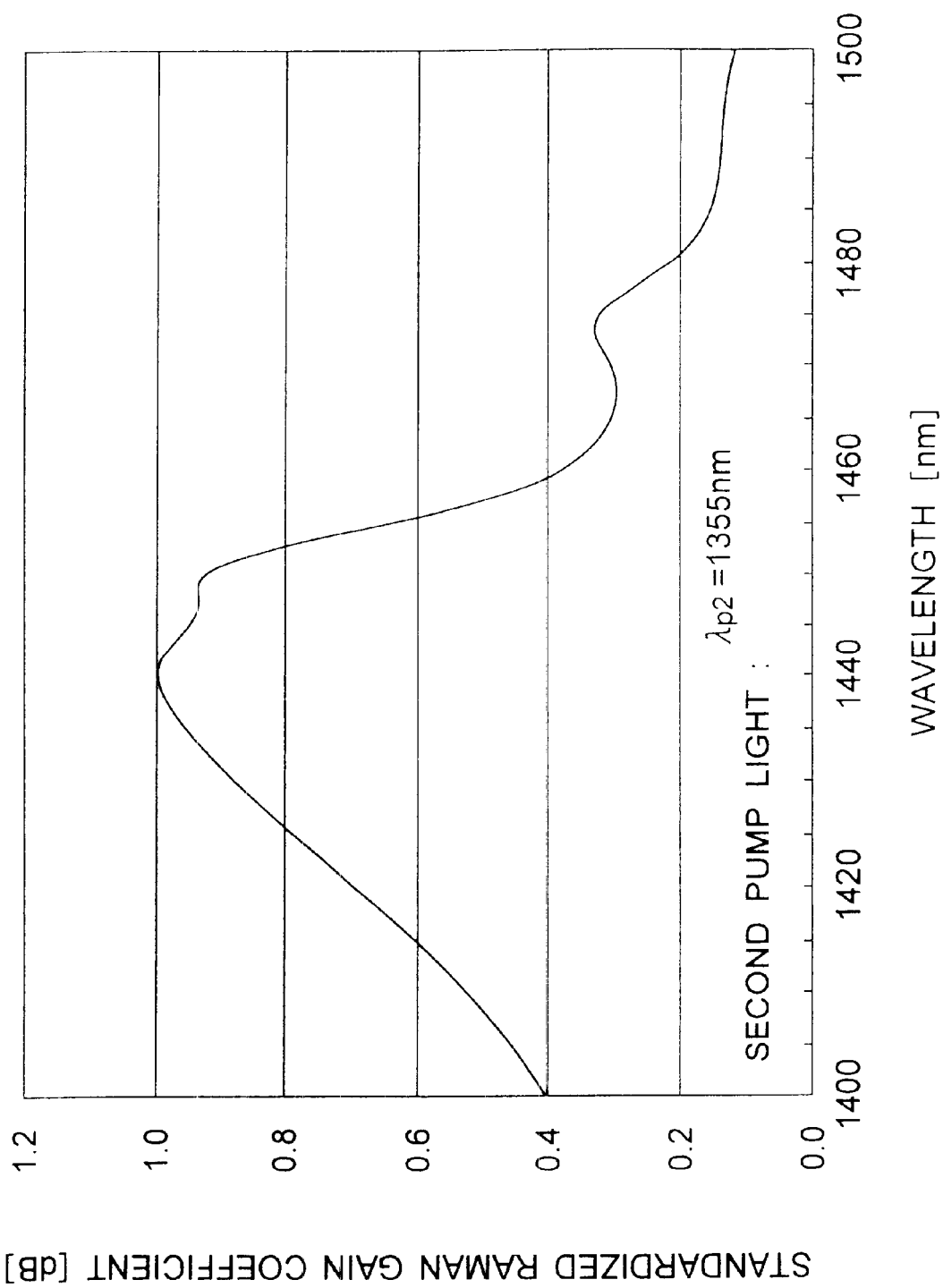
FIG. 18 is a view showing the fact that gain received by one of first pump lights having multiplexed wavelengths can be made greater than gain received by the other pump light by appropriately selecting a wavelength of second pump light.
Figure 19:
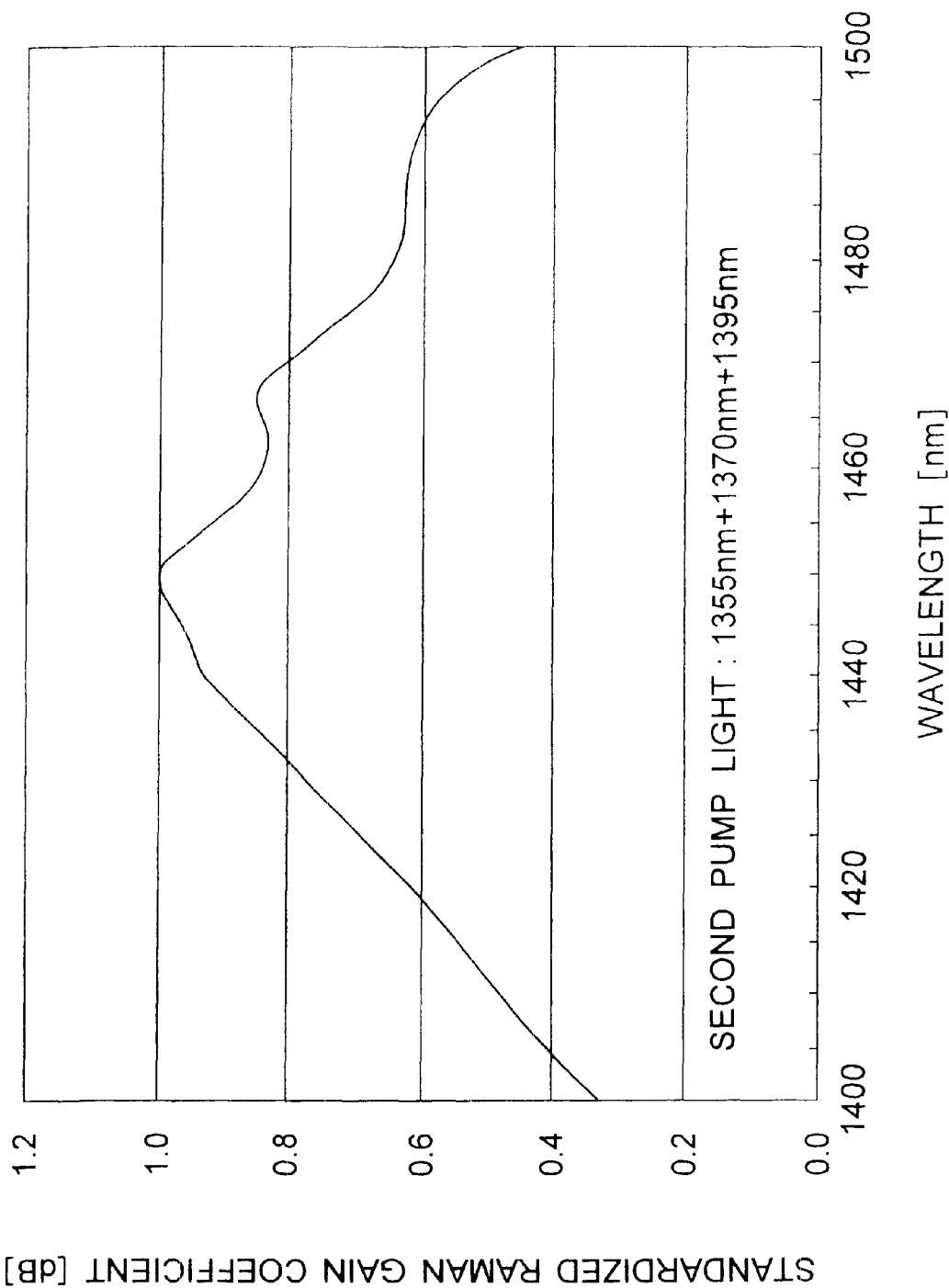
FIG. 19 is a view showing an example of gain shape with respect to a wavelength band of the first pump light when a wavelength division multiplexing pump source is used for the second pump light.

As shown in FIG. 17, by selecting the wavelength of the second pump light to a wavelength slightly shorter than the wavelength shorter than 1450 nm by the amount corresponding to the Raman shift of the amplifier fiber, the gain to which the pump light having the wavelength of 1490 nm is subjected becomes smaller than the gain to which the pump light having the wavelength of 1450 nm is subjected (refer to FIG. 18). Further, in the Raman amplifier using the wavelength division multiplexing pump source, by appropriately selecting the wavelength interval and wavelength arrangement, any gain shape can be realized. Accordingly, by using the wavelength division multiplexing pump source for the second pump light, the gain shape for wavelength of the first pump light can be set freely, with the result that the wavelength dependency of the noise property of the signal band amplified by the first pump light can be controlled. FIG. 19 shows an example of the gain shape for the wavelength of the first pump light when the wavelength division multiplexing pump source is used for the second pump light. In FIG. 19, the difference in gain between the pump light having the wavelength of 1450 nm and the pump light having the wavelength of 1490 nm is further reduced. In particular, when the first pump light is multiplexed with relatively narrow wavelength interval (for example, about 15 nm), if the gain shape can be adjusted by the second pump light, the wavelength dependency of the noise property of the signal band can be controlled more minutely. The reason is that the gain profile of the signal band is comprised of the sum of gain profiles obtained from the plural pump lights.

(Sixth Embodiment)

In order to suppress the level variation of the optical signal, the level variation of the first pump light may be minimized as less as possible. In the conventional Raman amplification method, the level variation of the first pump light was caused by the propagation loss and could not be controlled. In the embodiments of the Raman amplification method of the present invention described above, the level variation of the first pump light is more reduced than the conventional method, by using the Raman gain to which the first pump light is subjected from the second pump light thereby to change the effective loss of the first pump light along the longitudinal direction of the optical fiber. However, the level variation of the second pump light is still based upon the propagation loss and, therefore, cannot be controlled. In a six embodiment of the present invention, by introducing third pump light for Raman-amplifying the second pump light, the level variation of the second pump light can be further reduced, with the result that the level variation s of the first pump light and the optical signal can be expected to be reduced.

(Seventh Embodiment)

As well-known fact, it is known that the soliton in the non-loss optical transmission line can maintain its wave form not only in a case where the wavelength of the optical signal is single but also in case of the wavelength division multiplexing system (for example, refer to "Soliton propagation in long fibers with periodically compensated loss, Journal of Quantum Electronics", vol. QE-22, No. 1, written by L. F. Mollenauer et al and published in 1986). Further, in case of soliton having single wavelength, even in the transmission line having loss, it has been proved theoretically and experimentally that the transmission can be effected as soliton so long as the loss is compensated by optical direct amplification (for example, refer to "Numerical study of optical solution transmission amplified periodically by the stimulated Raman process, Applied Optics", Vol. 23, No. 19, pp. 3302-3309, written by A. Hasegawa and published in 1984, "Experimental demonstration of solution propagation in long fibers: loss compensated by Raman gain, Optics Letters", Vol. 10, No. 5, pp. 229-231, written by L. F. Mollenauer et al and published in 1985, and U.S. Pat. No. 4,558,921). In the past, although it was considered that this is possible even in the wavelength division multiplexing systems (for example, refer to Japanese Patent No. 2688350 and "Wavelength division multiplexing with solutions in ultra-long distance transmission using lumped amplifiers, Journal of Lightwave Technology", Vol. 9, No. 3, written by L. F. Mollenauer et al and published in 1991), later, it has been proved that, in the wavelength division multiplexing systems, the soliton communication cannot be realized so long as the proper setting is not effected (for example, refer to "Pseudo-phase-matched four-wave mixing in solution wavelength-division multiplexing transmission, Optics Letters", Vol. 21, No. 6, written by P. V. Mamyshev et al and published in 1996). Further, as one of solitons, there is a technique called as "dispersion compensated soliton" which has widely been used because practical wavelength division multiplexing transmission is possible. However, unlike to the pure soliton, since the pulse broadening is generated on the way of the propagation, non-linear effect generated due to forward and backward overlapping of bits causes non-reversible wave form distortion.

Some known literatures describe that the pure wavelength division multiplexing soliton communication is possible by using an optical transmission line in which dispersion is reduced in accordance with loss of the optical transmission line. However, such a method is hard to be put to a practical use since not only existing optical transmission lines cannot be utilized but also control of the dispersion of the optical transmission line is complicated and difficult.

Figure 20:
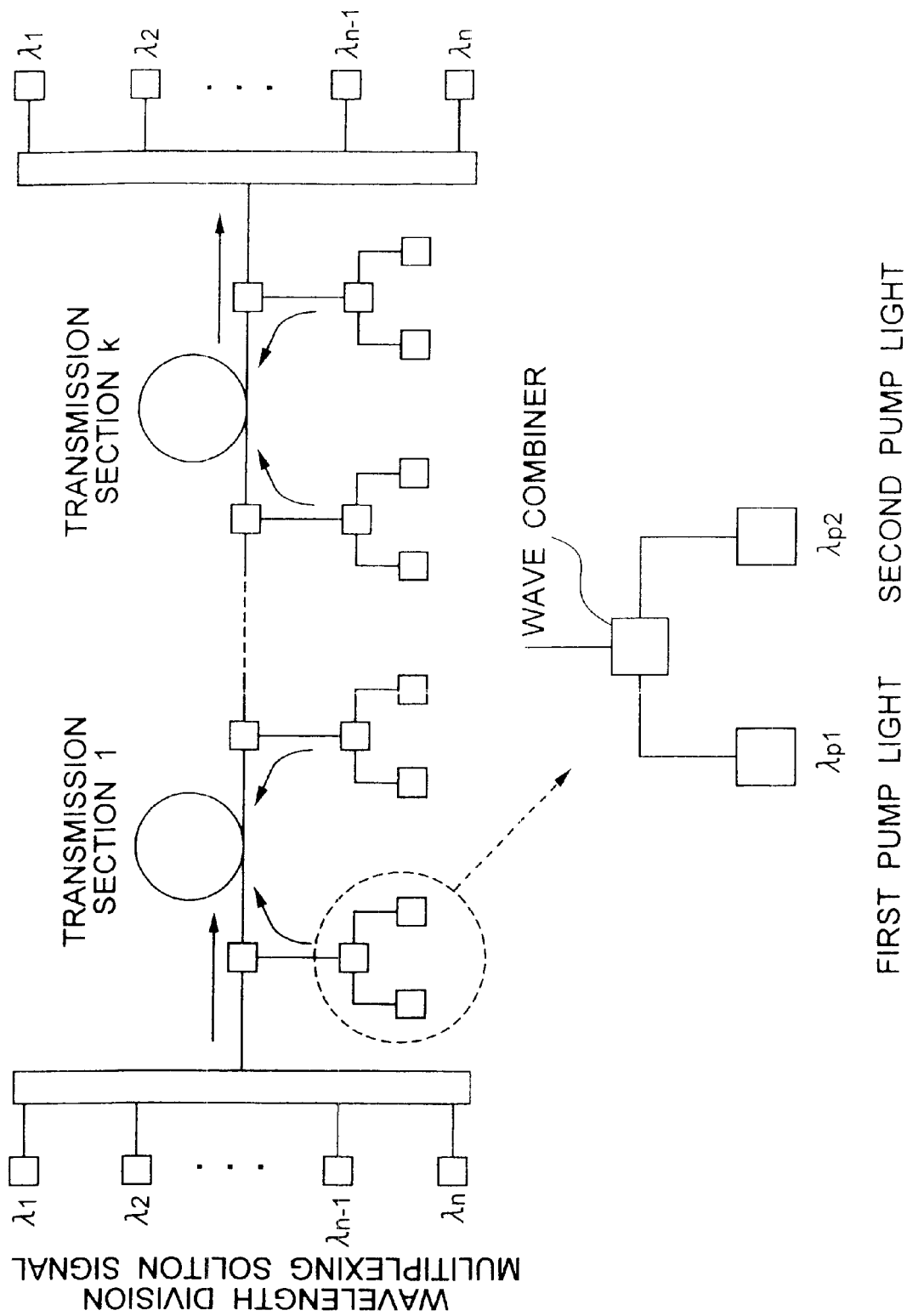
FIG. 20 is a schematic view of a wavelength division multiplexing soliton communication system using an optical transmission line to which the Raman amplification method shown in FIG. 12 is applied.
Figure 21:
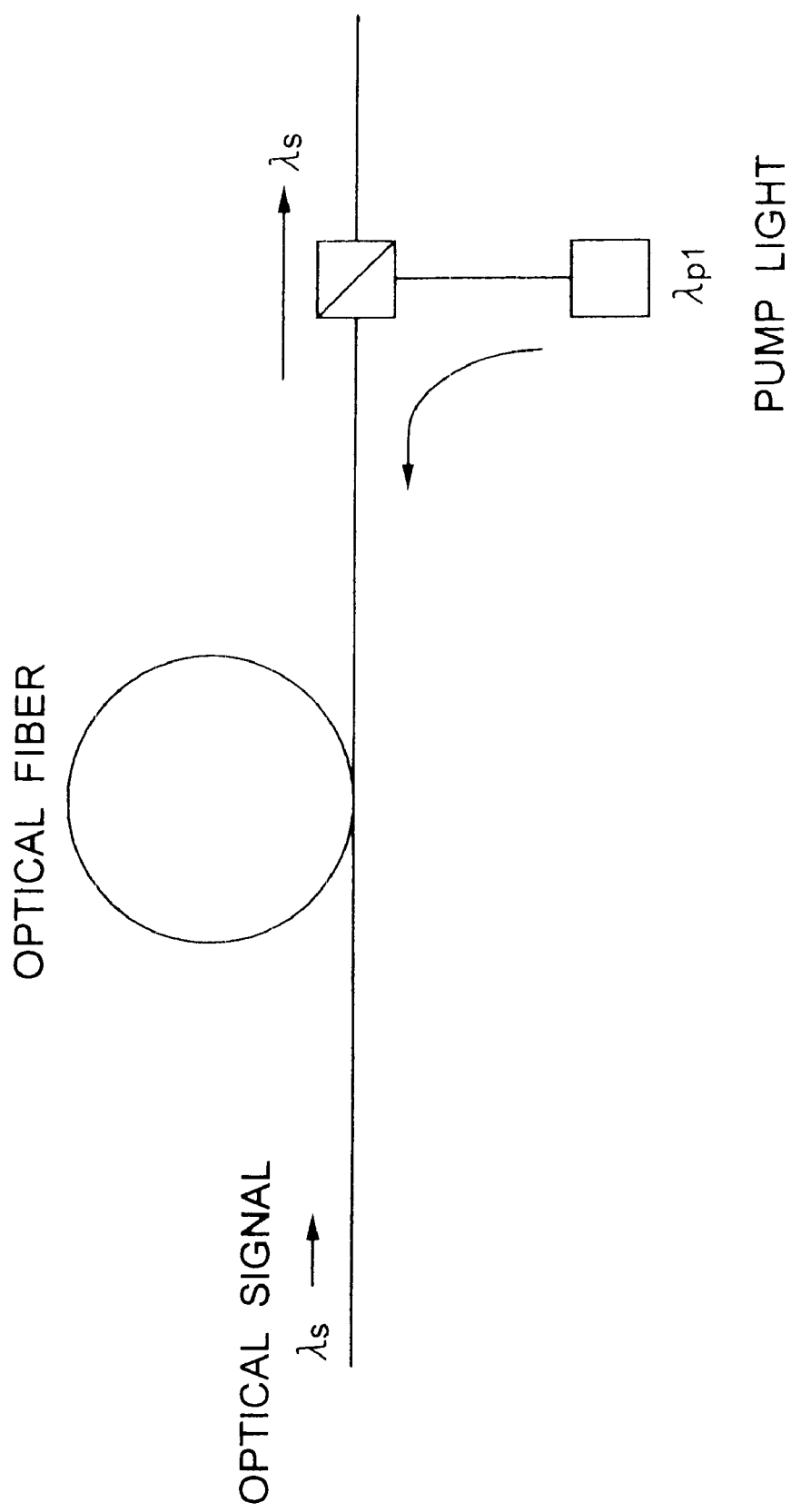
FIG. 21 is an explanatory view showing a conventional Raman amplification method.
Figure 22:
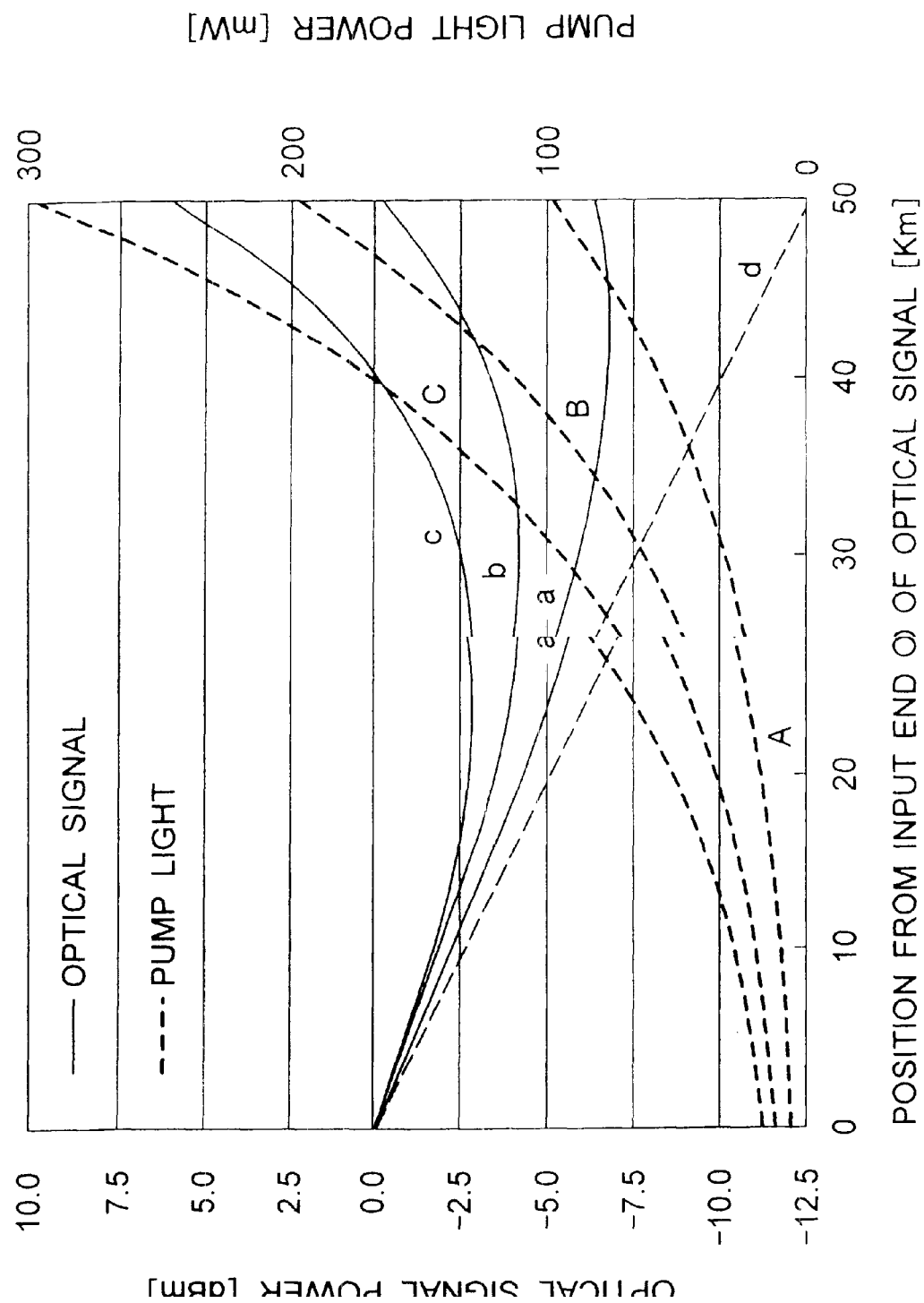
FIG. 22 is a view showing change in optical signal power when pump light is not inputted and when the pump light is inputted in the conventional Raman amplification method and when incident power of the pump light is changed.
Figure 23:
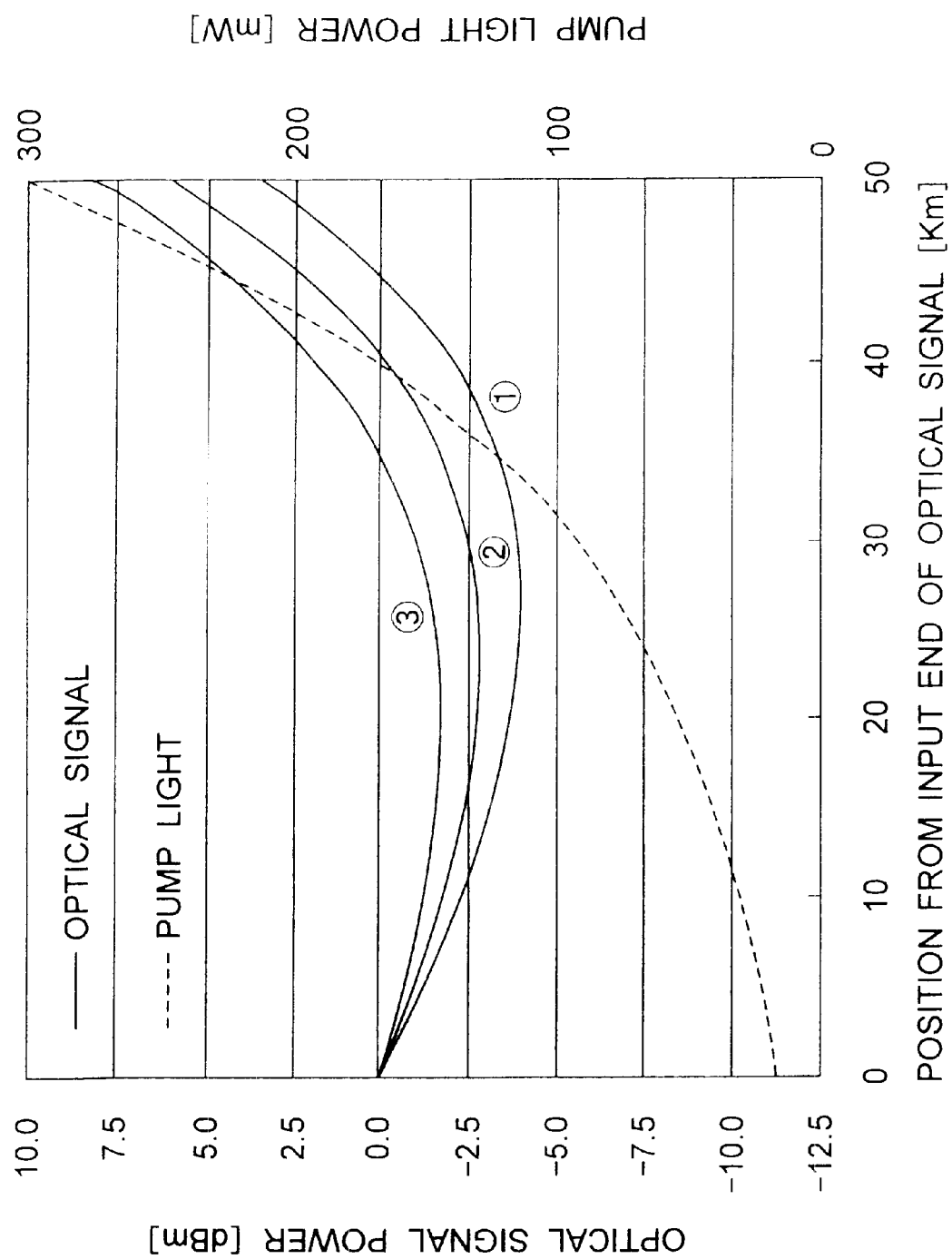
FIG. 23 is a view showing change in optical signal power depending upon change in attenuation constant of the optical signal in the conventional Raman amplification method.
Figure 24:
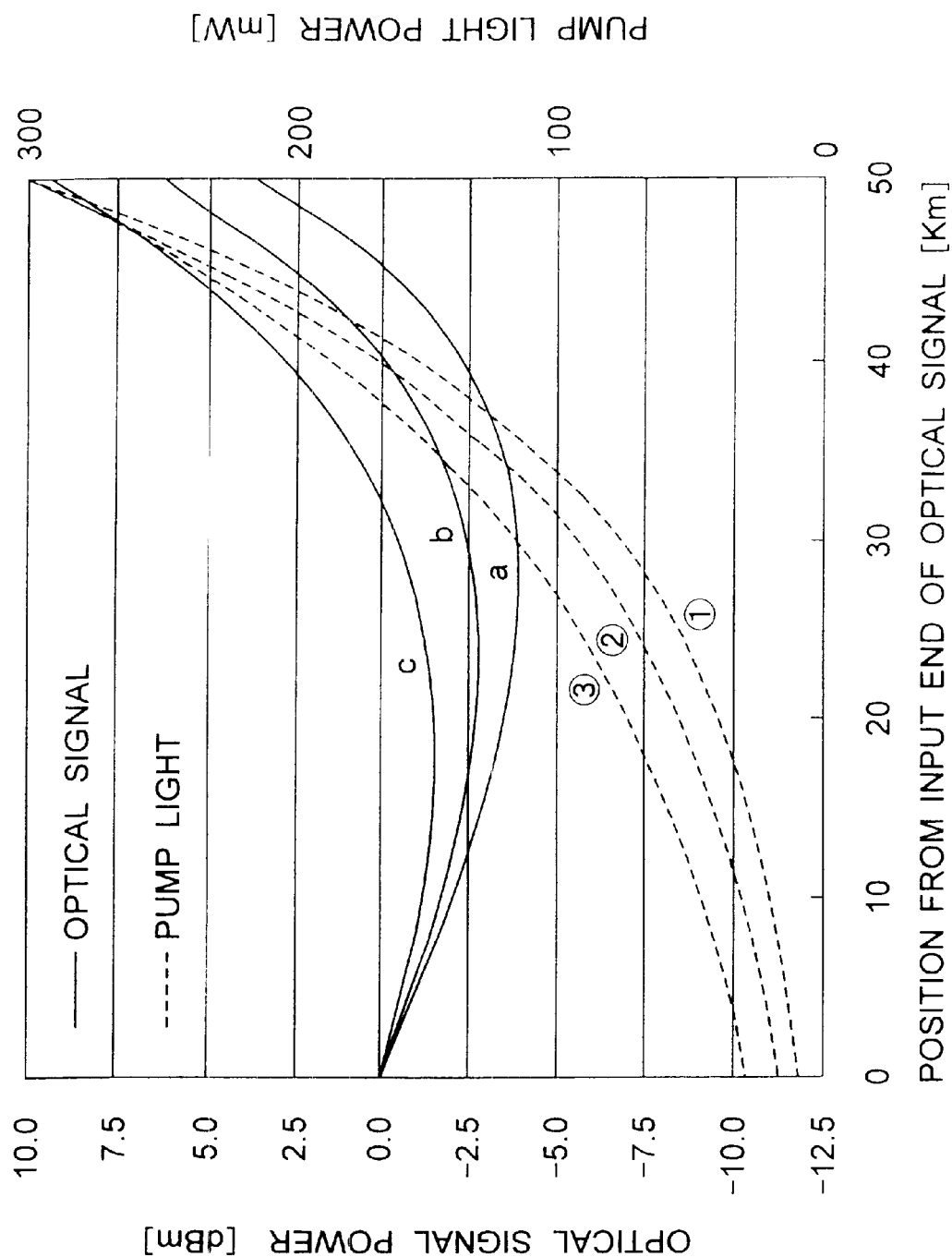
FIG. 24 is a view showing change in pump light and optical signal depending upon change in attenuation constant of the pump light in the conventional Raman amplification method.
Figure 25:
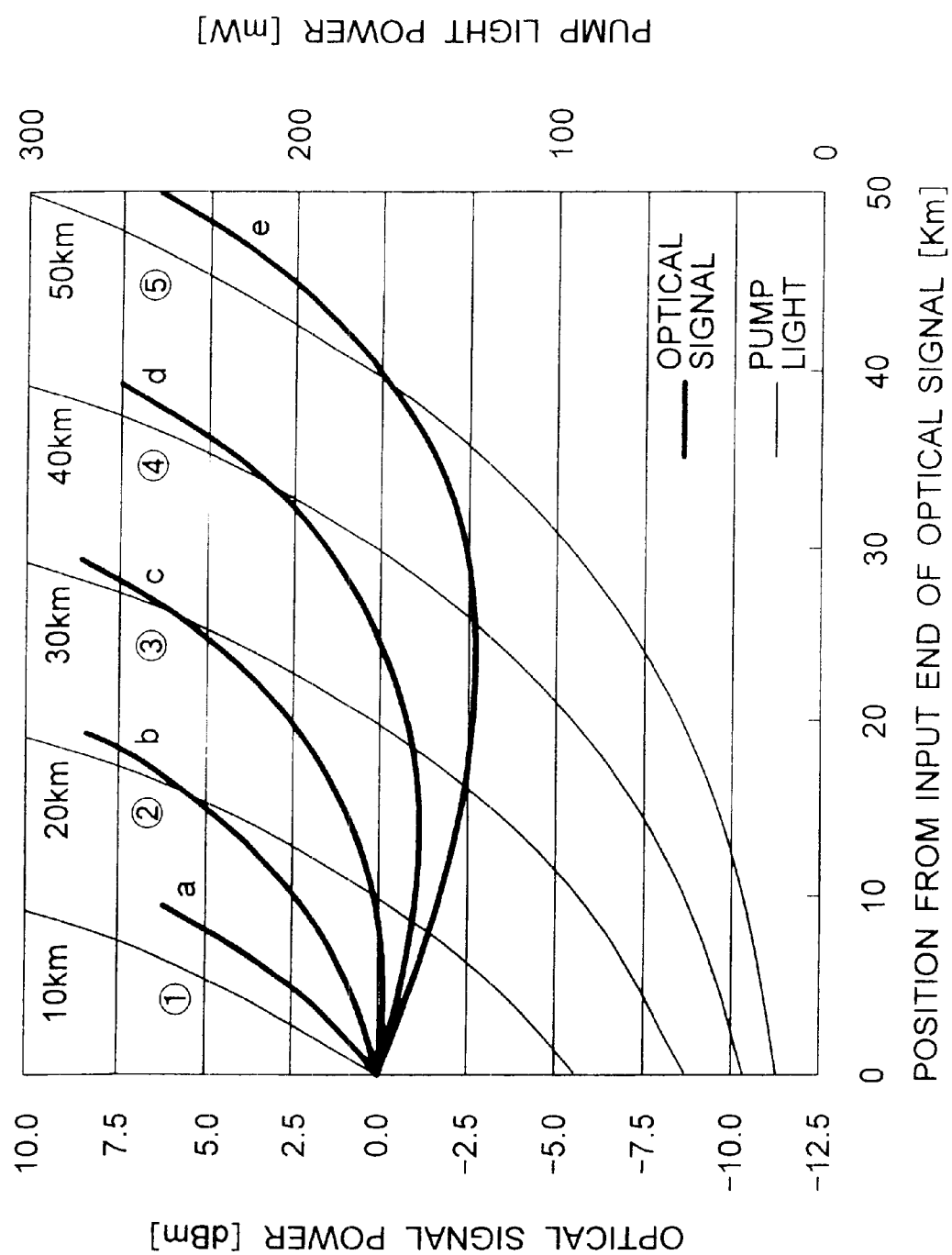
FIG. 25 is a view showing intensity distributions of the pump light and the optical signal when a length of an amplifier fiber is changed in the conventional Raman amplification method.
Figure 26:
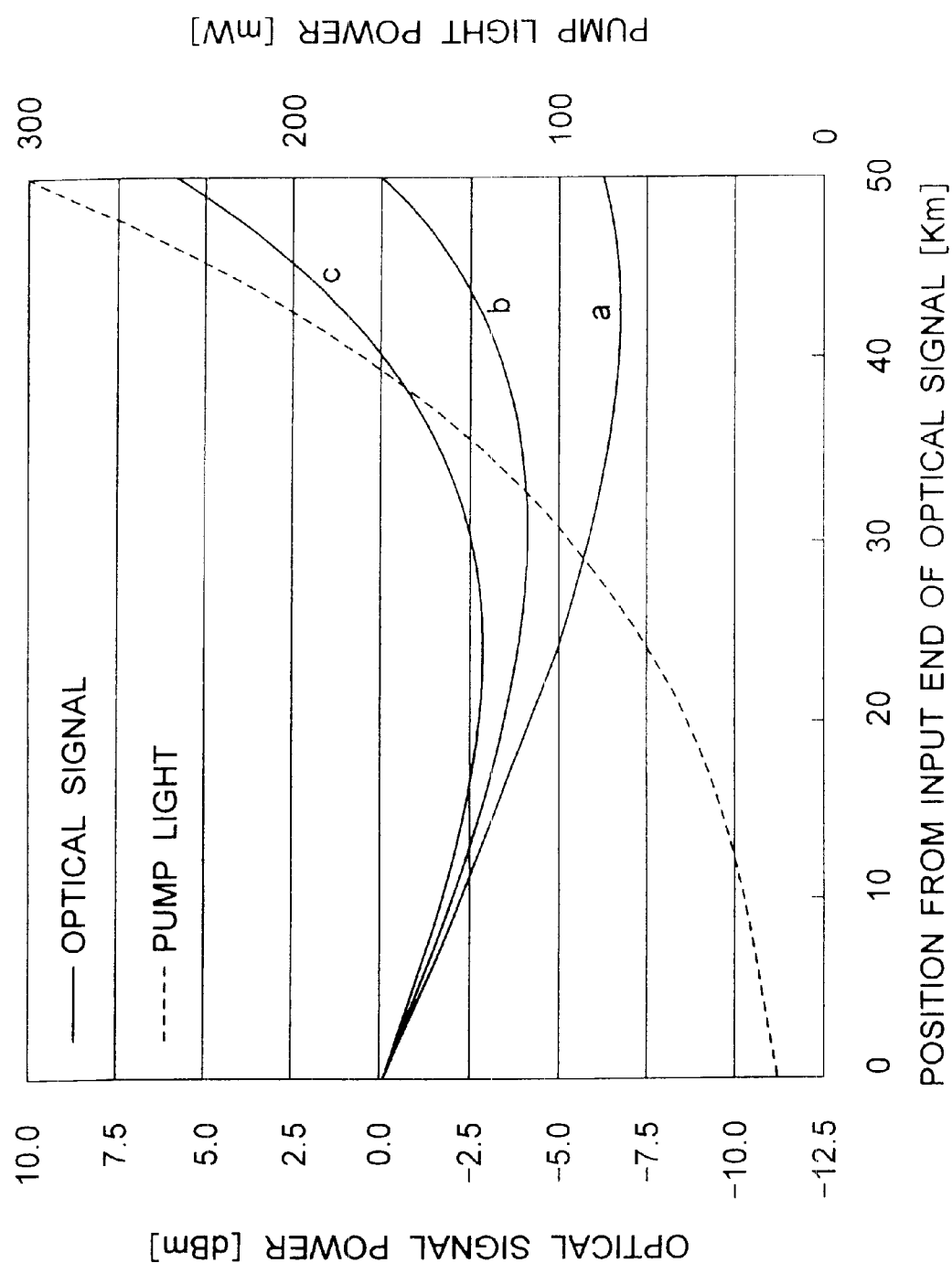
FIG. 26 is a view showing change in optical signal when Raman gain coefficient is changed in the conventional Raman amplification method.
Figure 27:
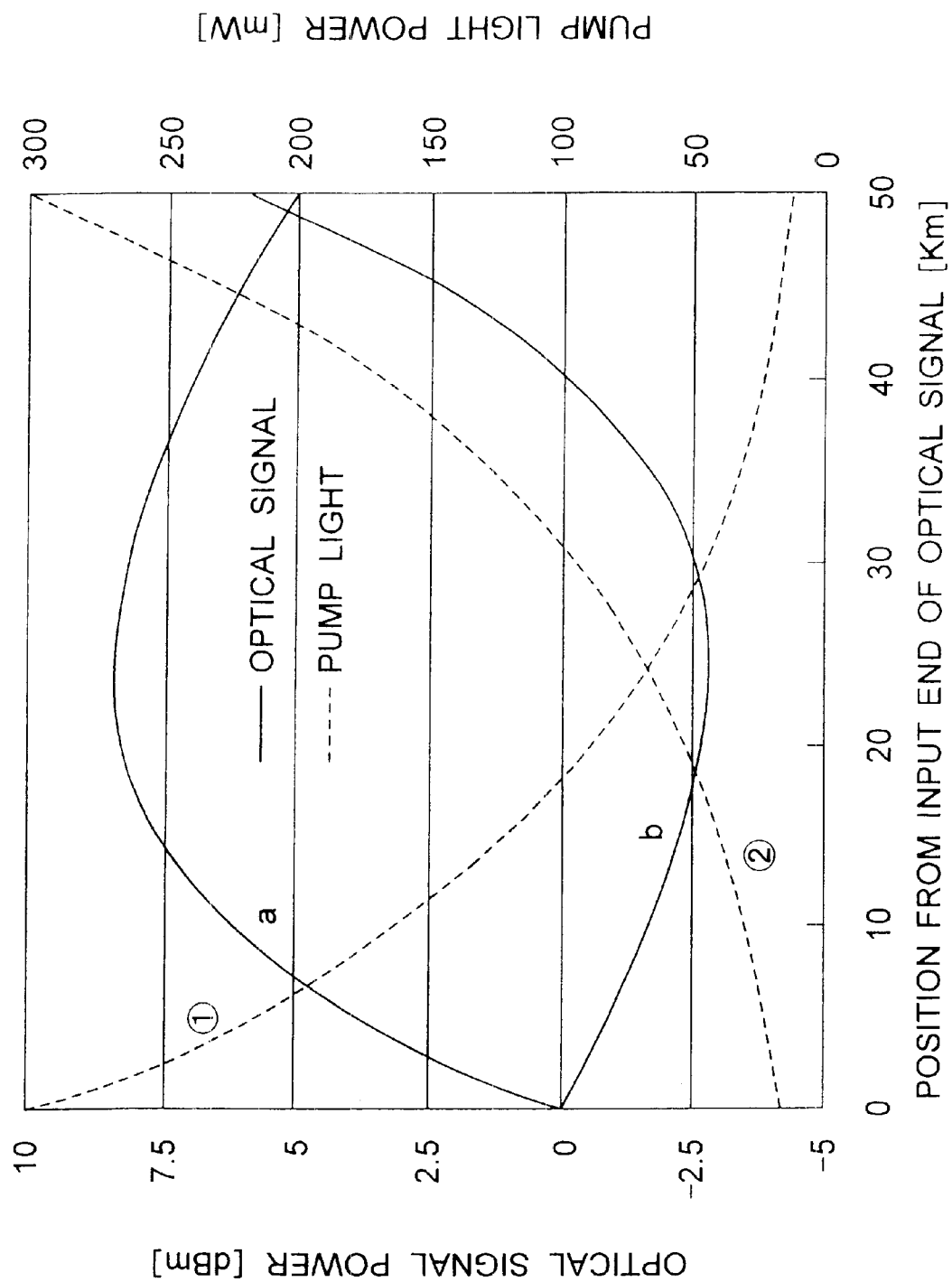
FIG. 27 is an explanatory view showing intensity distributions of the pump light and the optical signal upon forward pumping and backward pumping in the conventional Raman amplification method.

On the other hand, it is expected that the pure wavelength division multiplexing soliton can be propagated by realizing an optical transmission line very similar to the non-loss transmission line by using distributed amplification such as Raman amplification. However, since it was required that the pump sources be installed with relatively short distance or interval in order to realize such an optical transmission line at the conventional technical level, this was not practical. As mentioned above, by using the Raman amplification method according to the present invention, the optical transmission line more resemble to the non-loss transmission line can be realized through longer distance, in comparison with the conventional techniques. Accordingly, in the wavelength division multiplexing soliton communication using this optical transmission line, it is expected that transmission property is improved greatly in comparison with the conventional communications. FIG. 20 shows an embodiment of a wavelength division multiplexing soliton communication system using the optical transmission line to which the Raman amplification method according to the third embodiment of the present invention is applied. In this system, since the maximum distance of a transmission line section is determined by selecting how extent the optical transmission line is resembled to the non-loss transmission line, i.e., how amount the allowable value of the level variation of the optical signal is given, each section is formed with shorter distance and the entire method is constructed by interconnecting plural sections.

Industrial Availability

The first Raman amplification method according to the first aspect of the present invention achieves the following effects:

① Since the first and second pump light exist simultaneously in the amplifier fiber, the first pump lights is subjected to Raman amplification from the second pump light. Thus, in comparison with the case where there is no second pump light, the intensity of the first pump light becomes greater in the vicinity of the optical signal input end, with the result that the deterioration of the S/N ratio at the signal input side is suppressed, thereby improving the noise properties of the transmission system and the amplifier.

② The noise property can be optimized by properly selecting the power division, wavelength interval and pumping scheme of the first and second pump lights in accordance with the length of the amplifier fiber and the attenuation constants of the optical signal and the pump lights and by voluntarily controlling the intensity distribution (along the longitudinal direction) of the first pump light for Raman-amplifying the optical signal.

③ Since the second pump light is inputted from the optical signal input end, the intensity of the second pump light in the vicinity of the optical signal input end can be made greater in comparison with the case where the second pump light is inputted from the optical signal output end. Accordingly, the gain to which the first pump light is subjected from the second pump light in the vicinity of the optical signal input end can be increased efficiently, thereby improving the noise property of the Raman amplifier efficiently.

In the second Raman amplification method according to the second aspect, the following effect can be achieved, as well as the above effects. That is to say, since the second pump light is also inputted from the optical signal output end, the degree of freedom when the intensity distribution of the first pump light along the longitudinal direction of the optical fiber is controlled is increased, with the result that the intensity distribution of the optical signal along the longitudinal direction of the optical fiber can easily be controlled. Under the condition that the input and output levels of the optical signal are regulated (as is in the multi-stage relay of the amplifier of distributed type), it is effective to optimize the noise property.

In the third Raman amplification method according to the third aspect, the following effects can be achieved, as well as the effects of the second Raman amplification method:

① Since the first pump light for Raman-amplifying the optical signal is also inputted from the optical signal input end of the amplifier fiber, the intensity of the first pump light in the vicinity of the optical signal input end can easily be increased, in comparison with the first and second Raman amplification methods. Thus, the noise property of the Raman amplifier can be improved more efficiently.

② Since the first and second pump lights are inputted from both optical signal input and output ends, the intensity distribution of the first pump light can be made more uniform along the longitudinal direction of the optical fiber, in comparison with the first and second Raman amplification methods. Thus, the condition resemble to the non-loss transmission line can be easily realized.

In the fourth Raman amplification method according to the fourth aspect, the following effect can be achieved, as well as the effects of the first to third Raman amplification methods. That is to say, since the second pump light has the wavelength shorter than the wavelength of the first pump light by the amount corresponding to the Raman shift of the amplifier fiber, the Raman gain to which the first pump light is subjected from the second pump light becomes maximum, thereby improving the noise property efficiently.

In the fifth Raman amplification method according to the fifth aspect, the following effect can be achieved, as well as the effects of the first to third Raman amplification methods. That is to say, since the Raman amplification band of the second pump light is not overlapped with the wavelength band of the optical signal, the unevenness of the intensity of the second pump light propagated in the same direction as the optical signal is not overlapped with the signal wave form, with the result that the noise is hard to be generated and the propagation property is enhanced.

In the sixth Raman amplification method according to the sixth aspect, since the wavelength of the second pump light is selected to the wavelength slightly deviated from the wavelength shorter than the wavelength of the first pump light by the amount corresponding to the Raman shift of the amplifier fiber, the gain coefficient of the Raman gain to which the first pump light is subjected from the second pump light can be reduced voluntarily. By utilizing this means, since the degree of freedom when the intensity distribution of the first pump light along the longitudinal direction of the optical fiber is controlled is increased, the noise property can easily be optimized even under the condition that the input and output levels of the amplifier are regulated.

In the seventh Raman amplification method according to the seventh aspect, since the multiplex light source is used for one or both of the first and second pump lights, pump lights having high output can be obtained, which is convenient to optimize the noise property. Particularly when the wavelength division multiplexing pump source comprised of plural wavelengths is used for the first pump light, by properly selecting the wavelength of the second pump light, the wavelength dependency of the noise property of the optical signal can also be controlled. Further, when the wavelength division multiplexing pump source is used for the second pump light, the wavelength dependency of the noise property of the optical signal can be controlled more freely.

In the eighth Raman amplification method according to the eighth aspect, since the semiconductor laser is used for the light source of the first pump light, the following effect can be achieved. When the first pump light and the optical signal are propagated in the same direction, the unevenness of intensity of the pump light is overlapped with the unevenness of the gain and the overlapped unevenness is overlapped with the optical signal to generate the intensity noise of the optical signal, thereby deteriorating the propagation property. However, in general, since the semiconductor laser has less intensity unevenness, such intensity noise can be suppressed.

In the ninth Raman amplification method according to the ninth aspect, since the third pump light is introduced into the transmission line to Raman-amplify the second pump light thereby reduce the effective propagation loss of the second pump light, in comparison with the case where the third pump light is not inputted, the level unevenness of the second pump light along the longitudinal direction is reduced, and, thus, the level unevenness of the first pump light and the optical signal along the longitudinal direction can also be reduced. Accordingly, the condition more resemble to the non-loss transmission line in which the intensity of the optical signal is uniform in the propagating direction can be realized.

In the first optical signal transmission method according to the present invention, since the deterioration of the S/N ratio and the wave form deterioration due to the non-linear effect can be relaxed simultaneously by propagating the optical signal in the longitudinal direction of the optical transmission line with substantially constant level by using one of the first to ninth Raman amplification methods, the optical communication method having transmission property superior to the conventional property can be realized.

In the second optical signal transmission method according to the present invention, the following effects can be achieved, as well as the effect obtained by the first optical signal transmission method:

① In order to permit the wavelength division multiplexing transmission by using the pure soliton, it is required to use the transmission line in which dispersion is reduced in accordance with the loss of the transmission line. The reason is that the dispersion of the transmission line must have a value in accordance with the peak power of the soliton pulse in order to maintain the soliton wave form. On the other hand, in the optical signal transmission method according to the present invention, since the optical signal is propagated in the longitudinal direction of the optical transmission line with substantially constant level by using one of the first to ninth Raman amplification methods, it is not required that the dispersion of the transmission line be changed. This means that the pure wavelength division multiplexing soliton communication can be achieved by using the existing transmission line which could not achieve such communication.

② As one of solitons, there is a technique called as "dispersion compensated soliton" capable of achieving the practical wavelength division multiplexing transmission.

Although this technique is strong to change in peak power of the soliton pulse in comparison with the pure soliton, also regarding this technique, it is desirable that the level of the optical signal is maintained to substantially constant along the longitudinal direction of the transmission line. Accordingly, the optical signal transmission method according to the present invention is effective to this technique.

What is claimed is:

1. A Raman amplification method utilizing Raman scattering within an optical fiber, comprising:
   inputting a first pump light adapted to Raman-amplify an optical signal to an amplifier fiber from an optical signal output end of said optical fiber; and
   inputting a second pump light having a wavelength shorter than that of the first pump light and adapted to Raman-amplify the first pump light to said amplifier fiber from an optical signal input end of said amplifier fiber,
   wherein said step of inputting a second pump light comprises inputting a second pump light having a wavelength shorter than a wavelength of the first pump light by an amount corresponding to Raman shift of said amplifier fiber.

2. A Raman amplification method according to claim 1, wherein at least one of said step of inputting a first pump light and said step of inputting a second pump light comprises providing a wavelength division multiplexing pump source constituted by a plurality of wavelengths.

3. A Raman amplification method according to claim 1, wherein said step of inputting a first pump light comprises providing a semiconductor laser as the light source of the first pump light.

4. A Raman amplification method according to claim 1, further comprising:
   introducing a third pump light into an optical transmission line to Raman-amplify the second pump light.

5. A Raman amplification method utilizing Raman scattering within an optical fiber, comprising:
   inputting a first pump light adapted to Raman-amplify an optical signal to an amplifier fiber from an optical signal output end of said optical fiber; and
   inputting a second pump light having a wavelength shorter than that of the first pump light and adapted to Raman-amplify the first pump light to said amplifier fiber from an optical signal input end of said amplifier fiber,
   wherein said step of inputting a second pump light comprises inputting a second pump light having a Raman amplifying band that is not overlapped with a wavelength band of an optical signal within said amplifying fiber.

6. A Raman amplification method according to claim 5, wherein at least one of said step of inputting a first pump light and said step of inputting a second pump light comprises providing a wavelength division multiplexing pump source constituted by a plurality of wavelengths.

7. A Raman amplification method according to claim 5, wherein said step of inputting a first pump light comprises providing a semiconductor laser as the light source of the first pump light.

8. A Raman amplification method according to claim 5, further comprising:
   introducing a third pump light into an optical transmission line to Raman-amplify the second pump light.

9. A Raman amplification method utilizing Raman scattering within an optical fiber, comprising:
   inputting a first pump light adapted to Raman-amplify an optical signal to an amplifier fiber from an optical signal output end of said optical fiber; and
   inputting a second pump light having a wavelength shorter than that of the first pump light and adapted to Raman-amplify the first pump light to said amplifier fiber from an optical signal input end of said amplifier fiber,
   wherein said step of inputting a second pump light comprises inputting a second pump light having a wavelength slightly deviated from a wavelength shorter than a wavelength of the first pump light by an amount corresponding to a Raman shift of said amplifier fiber.

10. A Raman amplification method according to claim 9, wherein at least one of said step of inputting a first pump light and said step of inputting a second pump light comprises providing a wavelength division multiplexing pump source constituted by a plurality of wavelengths.

11. A Raman amplification method according to claim 9, wherein said step of inputting a first pump light comprises providing a semiconductor laser as the light source of the first pump light.

12. A Raman amplification method according to claim 9, further comprising:
   introducing a third pump light into an optical transmission line to Raman-amplify the second pump light.

13. A Raman amplification method utilizing Raman scattering within an optical fiber, comprising:
   inputting a first pump light adapted to Raman-amplify an optical signal to an amplifier fiber from an optical signal output end of said optical fiber; and
   inputting a second pump light having a wavelength shorter than that of the first pump light and adapted to Raman-amplify the first pump light to said amplifier fiber from an optical signal input end of said amplifier fiber,
   wherein at least one of said step of inputting a first pump light and said step of inputting a second pump light comprises providing a wavelength division multiplexing pump source constituted by a plurality of wavelengths.

14. A Raman amplification method according to claim 13, wherein said step of inputting a first pump light comprises providing a semiconductor laser as the light source of the first pump light.

15. A Raman amplification method according to claim 13, further comprising:
   introducing a third pump light into an optical transmission line to Raman-amplify the second pump light.

16. A Raman amplification method utilizing Raman scattering within an optical fiber, comprising:
   inputting a first pump light adapted to Raman-amplify an optical signal to an amplifier fiber from an optical signal output end of said optical fiber; and
   inputting a second pump light having a wavelength shorter than that of the first pump light and adapted to Raman-amplify the first pump light to said amplifier fiber from an optical signal input end of said amplifier fiber,
   wherein said step of inputting a first pump light comprises providing a semiconductor laser as the light source of the first pump light.

17. A Raman amplification method according to claim 16, further comprising:
   introducing a third pump light into an optical transmission line to Raman-amplify the second pump light.

18. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
introducing a third pump light into an optical transmission line to Raman-amplify the second pump light.

19. An optical signal transmission method, comprising:
inputting a first pump light adapted to Raman-amplify an optical signal to an amplifier fiber from an optical signal output end of said optical fiber; and
inputting a second pump light having a wavelength shorter than that of the first pump light and adapted to Raman-amplify the first pump light to said amplifier fiber from an optical signal input end of said amplifier fiber,
wherein an optical signal is propagated through an optical transmission line while maintaining a level of the optical signal substantially constant in a longitudinal direction of the optical transmission line, and
wherein a soliton signal wavelength of which is multiplexed is used as the optical signal.

20. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
inputting the second pump light from said optical signal output end of said amplifier fiber,
wherein said step of inputting a second pump light comprises inputting a second pump light having a wavelength shorter than a wavelength of the first pump light by an amount corresponding to Raman shift of said amplifier fiber.

21. The Raman amplification method according to claim 20, comprising:
inputting the first pump light from said optical signal input end of said amplifier fiber.

22. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
inputting the second pump light from said optical signal output end of said amplifier fiber,
wherein said step of inputting a second pump light comprises inputting a second pump light having a Raman amplifying band that is not overlapped with a wavelength band of an optical signal within said amplifying fiber.

23. The Raman amplification method according to claim 22, comprising:
inputting the first pump light from said optical signal input end of said amplifier fiber.

24. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
inputting the second pump light from said optical signal output end of said amplifier fiber,
wherein said step of inputting a second pump light comprises inputting a second pump light having a wavelength slightly deviated from a wavelength shorter than a wavelength of the first pump light by an amount corresponding to a Raman shift of said amplifier fiber.

25. The Raman amplification method according to claim 24, comprising:
inputting the first pump light from said optical signal input end of said amplifier fiber.

26. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
inputting the second pump light from said optical signal output end of said amplifier fiber,
wherein at least one of said step of inputting a first pump light and said step of inputting a second pump light comprises providing a wavelength division multiplexing pump source constituted by a plurality of wavelengths.

27. The Raman amplification method according to claim 26, comprising:
inputting the first pump light from said optical signal input end of said amplifier fiber.

28. A Raman amplification method utilizing Raman scattering within an optical fiber, comprising:
inputting a first pump light adapted to Raman-amplify an optical signal to an amplifier fiber from an optical signal output end of said optical fiber;
inputting a second pump light having a wavelength shorter than that of the first pump light and adapted to Raman-amplify the first pump light to said amplifier fiber from an optical signal input end of said amplifier fiber; and
inputting the second pump light from said optical signal output end of said amplifier fiber,
wherein said step of inputting a first pump light comprises providing a semiconductor laser as the light source of the first pump light.

29. A Raman amplification method according to claim 28, comprising:
inputting the first pump light from said optical signal input end of said amplifier fiber.

30. A Raman amplification method utilizing Raman scattering within an optical fiber, comprising:

inputting a first pump light adapted to Raman-amplify an optical signal to an amplifier fiber from an optical signal output end of said optical fiber;

inputting a second pump light having a wavelength shorter than that of the first pump light and adapted to Raman-amplify the first pump light to said amplifier fiber from an optical signal input end of said amplifier fiber;

inputting the second pump light from said optical signal output end of said amplifier fiber; and introducing a third pump light into an optical transmission line to Raman-amplify the second pump light.

31. The Raman amplification method according to claim 30, comprising:

inputting the first pump light from said optical signal input end of said amplifier fiber.

32. An optical signal transmission method, comprising:

inputting a first pump light adapted to Raman-amplify an optical signal to an amplifier fiber from an optical signal output end of said optical fiber;

inputting a second pump light having a wavelength shorter than that of the first pump light and adapted to Raman-amplify the first pump light to said amplifier fiber from an optical signal input end of said amplifier fiber; and inputting the second pump light from said optical signal output end of said amplifier fiber, wherein an optical signal is propagated through an optical transmission line while maintaining a level of the optical signal substantially constant in a longitudinal direction of ii, the optical transmission line.

33. An optical signal transmission method, comprising:

inputting a first pump light adapted to Raman-amplify an optical signal to an amplifier fiber from an optical signal output end of said optical fiber;

inputting a second pump light having a wavelength shorter than that of the first pump light and adapted to Raman-amplify the first pump light to said amplifier fiber from an optical signal input end of said amplifier fiber; and inputting the first pump light from said optical signal input end of said amplifier fiber, wherein an optical signal is propagated through an optical transmission line while maintaining a level of the optical signal substantially constant in a longitudinal direction of the optical transmission line.

34. An optical signal transmission method, comprising:

inputting a first pump light adapted to Raman-amplify an optical signal to an amplifier fiber from an optical signal output end of said optical fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line, and wherein said step of inputting a second pump light comprises inputting a second pump light having a wavelength shorter than a wavelength of the first pump light by an amount corresponding to Raman shift of said amplifier fiber.

35. An optical signal transmission method, comprising:

inputting a first pump light adapted to Raman-amplify an optical signal to an amplifier fiber from an optical signal output end of said optical fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line, and wherein said step of inputting a second pump light comprises inputting a second pump light having a Raman amplifying band that is not overlapped with a wavelength band of an optical signal within said amplifying fiber.

36. An optical signal transmission method, comprising:

inputting a first pump light adapted to Raman-amplify an optical signal to an amplifier fiber from an optical signal output end of said optical fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line, and wherein said step of inputting a second pump light comprises inputting a second pump light having a wavelength slightly deviated from a wavelength shorter than a wavelength of the first pump light by an amount corresponding to a Raman shift of said amplifier fiber.

37. An optical signal transmission method, comprising:

inputting a first pump light adapted to Raman-amplify an optical signal to an amplifier fiber from an optical signal output end of said optical fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line, and wherein at least one of said step of inputting a first pump light and said step of inputting a second pump light comprises providing a wavelength division multiplexing pump source constituted by a plurality of wavelengths.

38. An optical signal transmission method, comprising:

inputting a first pump light adapted to Raman-amplify an optical signal to an amplifier fiber from an optical signal output end of said optical fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line, and wherein said step of inputting a first pump light comprises providing a semiconductor laser as the light source of the first pump light.

39. An optical signal transmission method, comprising:

inputting a first pump light adapted to Raman-amplify an optical signal to an amplifier fiber from an optical signal output end of said optical fiber;

inputting a second pump light having a wavelength shorter than that of the first pump light and adapted to Raman-amplify the first pump light to said amplifier fiber from an optical signal input end of said amplifier fiber; and introducing a third pump light into said optical transmission line to Raman-amplify the second pump light, wherein an optical signal is propagated through an optical transmission line while maintaining a level of the optical signal substantially constant in a longitudinal direction of the optical transmission line.

40. A Raman amplification system utilizing Raman scattering within an optical fiber, comprising:

means for inputting a first pump light adapted to Raman-amplify an optical signal to an amplifier fiber from an optical signal output end of said amplifier fiber; and means for inputting a second pump light having a wavelength shorter than that of the first pump light and adapted to Raman-amplify the first pump light to said amplifier fiber from an optical signal input end of said amplifier fiber.

41. A Raman amplification method utilizing Raman scattering within an optical fiber, comprising:

inputting a first pump light adapted to Raman-amplify art optical signal to an amplifier fiber from an optical signal output end of said amplifier fiber; and inputting a second pump light having a wavelength shorter than that of the first pump light and adapted to Raman-amplify the first pump light to said amplifier fiber from an optical signal input end of said amplifier fiber, wherein said step of inputting a second pump light comprises controlling a wavelength dependency of a noise property of the optical signal by selecting the wavelength of the second pump light.

42. The method of claim 41, wherein said wavelength dependency of a noise property is substantially flat across a signal bandwidth of said optical signal.

43. The method of claim 41, wherein said second pump light is not a wave division multiplex (WDM) light.

44. The method of claim 41, wherein said second pump light is a wave division multiplex (WDM) light.

45. The method of claim 44, wherein said wave division multiplex (WDM) light is an inclusive range of 1355 nm through 1395 nm.

46. An optical transmission method, comprising:

inputting a first pump light adapted to Raman-amplify an optical signal to an amplifier fiber from an optical signal output end of said amplifier fiber; and inputting a second pump light having a wavelength shorter than that of the first pump light and adapted to Raman-amplify the first pump light to said amplifier fiber from an optical signal input end of said amplifier fiber, wherein said stop of inputting a second pump light comprises controlling a wavelength dependency of a noise property of the optical signal by selecting the wavelength of the second pump light.

47. The method of claim 46, wherein said wavelength dependency of a noise property is substantially flat across a signal bandwidth of said optical signal.

48. The method of claim 46, wherein said second pump light is not a wave division multiplex (WDM) light.

49. The method of claim 46, wherein said second pump light is a wave division multiplex (WDM) light.

50. The method of claim 49, wherein said wave division multiplex (WDM) light is an inclusive range of 1355 nm through 1395 nm.

51. An optical transmission method, comprising steps for:

Raman-amplifying an optical signal by applying a first pump light to an amplifier fiber from an optical signal output end of said amplifier fiber; and controlling a wavelength dependency of a noise property of the optical signal by applying a second pump light to said amplifier fiber from an optical signal input end of said amplifier fiber, said second pump light having a second pump light wavelength shorter than a first pump light wavelength.

52. A Raman amplification method utilizing Raman scattering within an optical fiber, comprising:

inputting a first pump light adapted to Raman-amplify an optical signal to an amplifier fiber from an optical signal output end of said amplifier fiber; and inputting a second pump light having a wavelength shorter than that of the first pump light and adapted to Raman-amplify the first pump light to said amplifier fiber from an optical signal input end of said amplifier fiber; and inputting the second pump light from said optical signal output end of said amplifier fiber.

53. A Raman amplification method comprising:

inputting a first pump light adapted to Raman-amplify an optical signal to an amplifier fiber from an optical signal output end of said amplifier fiber; and inputting a second pump light having a wavelength shorter than that of the first pump light and adapted to Raman-amplify the first pump light to said amplifier fiber from an optical signal input end of said amplifier fiber, wherein an optical signal is propagated through an optical transmission line while maintaining a level of the optical signal substantially constant in a longitudinal direction of the optical transmission line; and inputting the first pump light from said optical input end of said amplifier fiber.

* * * * *

UNITED STATES PATENT AND TRADEMARK OFFICE
CERTIFICATE OF CORRECTION

PATENT NO. : 6,633,697 B2
APPLICATION NO. : 09/774026
DATED : October 14, 2003
INVENTOR(S) : Emori et al.

It is certified that error appears in the above-identified patent and that said Letters Patent is hereby corrected as shown below:

On the title page, Item (75), the Inventors' cities of residence are incorrect. Item (75) should read:

Item -- (75) Inventors: Yoshihiro Emori, Tokyo (JP):
Shu Namiki, Tokyo (JP) --

Also on the title page, Item (73), the Assignee information is incorrect. Item (73) should read:

Item -- (73) Assignee: The Furukawa Electric Co., Ltd.,
Tokyo (JP) --

Signed and Sealed this

Twenty-fifth Day of March, 2008

JON W. DUDAS
*Director of the United States Patent and Trademark Office*